(12) United States Patent
Sahni

(10) Patent No.: US 9,807,681 B2
(45) Date of Patent: Oct. 31, 2017

(54) SYSTEM AND METHOD FOR A WIRELESS SECURITY AND AUTOMATION SYSTEM

(71) Applicant: Manbir Sahni, Aliso Viejo, CA (US)

(72) Inventor: Manbir Sahni, Aliso Viejo, CA (US)

( * ) Notice: Subject to any disclaimer, the term of this patent is extended or adjusted under 35 U.S.C. 154(b) by 110 days.

(21) Appl. No.: 14/829,745

(22) Filed: Aug. 19, 2015

(65) Prior Publication Data
US 2016/0249281 A1 Aug. 25, 2016

Related U.S. Application Data

(60) Provisional application No. 62/119,994, filed on Feb. 24, 2015.

(51) Int. Cl.
*H04W 48/16* (2009.01)
*H04W 52/02* (2009.01)
*G08B 27/00* (2006.01)
*H04L 29/08* (2006.01)
*G08B 26/00* (2006.01)
*H04W 84/12* (2009.01)

(52) U.S. Cl.
CPC ............ *H04W 48/16* (2013.01); *G08B 27/00* (2013.01); *G08B 27/006* (2013.01); *H04L 67/00* (2013.01); *H04W 52/0235* (2013.01); *H04W 84/12* (2013.01); *Y02B 60/50* (2013.01)

(58) Field of Classification Search
CPC ....... G08B 27/00; G08B 27/006; H04L 67/00; H04W 48/16; H04W 52/0235
See application file for complete search history.

(56) References Cited

U.S. PATENT DOCUMENTS

2015/0296468 A1* 10/2015 Dural .................. H04W 56/003
370/336
2016/0231817 A1* 8/2016 Tannenbaum .... H04W 52/0235

* cited by examiner

*Primary Examiner* — Andrew Lai
*Assistant Examiner* — Harry H Kim

(57) ABSTRACT

A security and automation system comprising a controller, the controller comprising a device memory, a processor, a display and communication interfaces, a controller application installed in the device memory of the controller and modules in communication with the controller, each of the modules comprising a processing unit, a WLAN chipset, a power unit and peripherals. For discovery and enrollment the modules are configured to operate as access points and, after said enrollment of the modules to the controller, the controller is configured as an access point by instructions processed by the processor of the controller and the modules are configured as stations to form a wireless intranet.

16 Claims, 17 Drawing Sheets

SYSTEM AND METHOD FOR A WIRELESS SECURITY AND AUTOMATION SYSTEM

FIELD OF THE INVENTION

The present invention relates to a security and automation system. More particularly, the present invention relates to systems, methods and devices that serve the need to secure, monitor and automate a property like home, office, hotel, dorm, factory, storage facility etc. and a vessel like automobile, truck, train, plane etc.

BACKGROUND OF THE INVENTION

Home or Office Security or Alarm Systems have been in existence for a long time. Most existing security systems are made up of a central security controller, door and window sensors, motion detectors, flood detectors, smoke, carbonmonoxide detectors etc. . . . . Lately a healthy mix of new sensors and actuators related to home automation have also been integrated to commercial security systems thus providing collective home automation and security solutions. While the industry and influence of prior art has started showing the integration of security and automation systems, the integration has been more of an afterthought posing limitations on seamless scaling of these systems as new applications evolve. Also despite the many recent advances in this space, the need to productize solutions in a rapidly evolving field has led even recent innovation to build up on existing facets and methodologies. This has led to a void in solving the problem of portability of these systems, which has definitive use cases for wide spectra of users. Alongside portability is the ease of usage and installation which is relevant both when security and automation systems are used in a mobile or fixed context.

Prior art that has made improvements in the portability and installation ease of security systems has done so by means of moving towards wireless systems that can be easily taped to building fixtures like doors, walls etc. However these systems still need an additional device that a user does not normally carry. This additional device serves as a central controller or in lay-person terms, the brain of the system. This aforementioned controller needs to be carried along with its power adapters and sensors, in the event a user needs to move locations. This is especially prohibitive if one was to be traveling or needed only a couple of the sensors to be used in a new temporary location.

Prior art that has suggested the usage of a mobile device, like a cellular phone, as a security controller has not used the cellular phone configured as an IEEE 802.11x or Wireless LAN (WLAN) Access Point (AP). The prior art has additionally not discussed methods that are necessary in realizing portability and simplicity like being able to share security access information without need of external devices, battery conservation etc. In other words, there is a need for a system architecture that requires very few components that the user has to maintain, configure or carry. This needed system despite its simplicity should still be able to serve the security and automation needs of the end user without compromising on the security of communication and of the overall system itself.

Also missing from prior art is an easy and secure solution to discover and enroll new security and automation devices to be a part of the system. Thus, there is a need for a discovery and enrollment process that will not be susceptible to main-in-the-middle type of attacks, and still be simple to execute without needing external input/output (IO) interface devices for entering authentication and configuration information.

Another missing aspect from prior art is a scalable solution to perform long range (line-of-sight approx 100 meters) communications between the controller of the system and its many modules in a simplified manner. The requirement of long range is normally not possible with RF technologies like Bluetooth. Technologies like Zigbee and Z-Wave on the other hand while capable of long range communications fail when scalability, for example in terms of high baud-rate, is needed for applications like a camera.

Another feature needed in prior art that enhances the mobile nature of security systems, is a strategy to conserve battery resources that can be used for different types of security and automation devices. To be able to detect the type of device and accordingly adjust the aggressiveness of battery conservation is an integral part of ensuring that the system can be used in a portable context. A very aggressive battery conservation strategy applied uniformly to all devices could put severe constraints on some use cases. On the other hand, a less aggressive battery conservation strategy applied uniformly to all devices would leave room for further improvement on devices that would allow it.

Commonplace security systems also often use devices and device architectures that are not necessarily amenable to easy installation or portability. Prior art door and window sensors currently in use today are one such example. A common door and window sensor device detects its opening and closing and is made up of two parts. One part of the device contains a reed switch typically installed on the movable part of the door or window whereas the other part of the device is a magnet typically installed on the frame or stationary part of the door or window. The reed switch is an electro-mechanical device that changes its state based on influence of magnetic fields. The reed switch is usually found in the normally-open form which means that the switch is normally off. When a magnet is brought near the reed switch, due to the influence of its magnetic field the filaments of the reed switch get attracted to each other making the switch turn on. This event can be detected by a microcontroller as a door-state-change event. In order for this sensor system to work correctly the reed switch and magnet need to be aligned correctly so that the magnetic field of the magnet can influence the reed switch. Such a device requires careful installation and removal making it inhibitive for portable and casual use.

Even in prior art which relies on MEMS (Micro-Electro-Mechanical-Systems) as a replacement of the above described reed switch, the art neither gears the system to be portable nor has a sophisticated way of using the device to recognize common patterns to qualify the data produced by the MEMS device. The post processing of MEMS data, though not strictly necessary in all cases, reduces the detection of false positives making the system more robust, which is especially necessary in security applications

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

One innovative embodiment of the present invention can be the aggregate of selected features from systems, methods and devices described in the Detailed Description of this specification. Other embodiments may comprise of, but not limited to, one or more of the features alone or in combination.

To exemplify the above statement, in one embodiment of a security and automation solution, the controller which is the brain of the system can be hosted on a mobile device, like a cellular phone, which will make itself available to sensor and actuator modules to connect over WLAN. The controller being resident on a mobile device would have the software infrastructure for its Graphical User Interface (GUI) components and for secure communication with the modules. The modules, usually less intelligent and simpler devices compared to the controller, would serve specific sensing and actuation functions in a security and automation system. In order to reduce the need for an Access Point, in this embodiment the controller's WLAN stack will be operated as a software-based access point (soft AP). The modules would then communicate with the controller over this WLAN intranet using IP socket interfaces and RPC (Remote Procedure Call) abstractions. The implied portability of the mobile device and modules is further enhanced by making the modules battery operated by carefully managing their wakeup time and by simplifying aspects of the module where needed.

A very minimal but scalable and non-limiting flavor of this embodiment can be visualized by considering a very simple security requirement of say a traveler who wants to secure the door of his or her hotel room or of a student wanting to secure the access to his or her dormitory room. The solution, based upon this embodiment, would only require a door sensor and a user's cellular phone, making the solution very portable and minimal. The simplified door module would be designed with a MEMS device, with a pattern recognition algorithm to identify a door movement. Due to its innovative design the door module can be made to operate even when strung over a door knob, since it does not need careful alignment with a magnet like that needed by a reed switch based sensor.

Note that while portability and ease of installation is illustrated with the above simplified use case, it is to be appreciated that the scope of this embodiment is not to be limited to one simplified door sensor and that the system will be equally effective with a plurality of other sensors and actuators like Passive Infra Red (PIR) motion detectors, flood sensors, freeze sensors, glass break sensors, temperature and humidity sensors, smart machines, cameras etc. and will still be functional with reed switch based door sensors. It should also be noted that despite the simplicity of this embodiment, the resulting system would be immune to power and telephone line related outages and malicious disruptions. The mobile device would further be able to communicate the detected events to a monitoring service or utilize its communication services to receive requests or send email or SMS to a predefined notification list.

In a different embodiment, the controller would be hosted on a tablet configured as a WLAN soft AP that communicates with a plurality of home automation and security modules. The controller would allow the user to configure rules to enact certain common functions of daily life, like open blinds at 7:00 am, turn on the HVAC if temperature and humidity are higher than a threshold etc.

In yet another embodiment, a MEMS based door and window sensor that performs pattern recognition on sensed data to qualify specific movements can serve as an innovate door and window sensing solution in a prior art Z-Wave based home security system.

BRIEF DESCRIPTION OF DRAWINGS

The following drawings illustrate systems, methods and devices in their various embodiments.

FIG. 1 shows the system architecture of a prior art security and automation system widely deployed today;

FIG. 17 shows the angular velocity measurements and calculated angular orientation change along the X, Y and Z axes when the door is heavily knocked on;

DETAILED DESCRIPTION OF THE INVENTION

Embodiments of the current invention relate to systems, methods and devices that aide in securing and monitoring premises and vessels. The key design goals of the embodiments in this specification are towards making security systems more portable, secure, simple to use and easy to install. It should be recognized however that the invention in no way precludes long term use of the systems, methods and devices described herewith, in cases where portability is not required. In order to realize its uniqueness, the embodiments of systems, methods and devices described underneath can be used individually or in aggregate, as described before.

Figure 1:
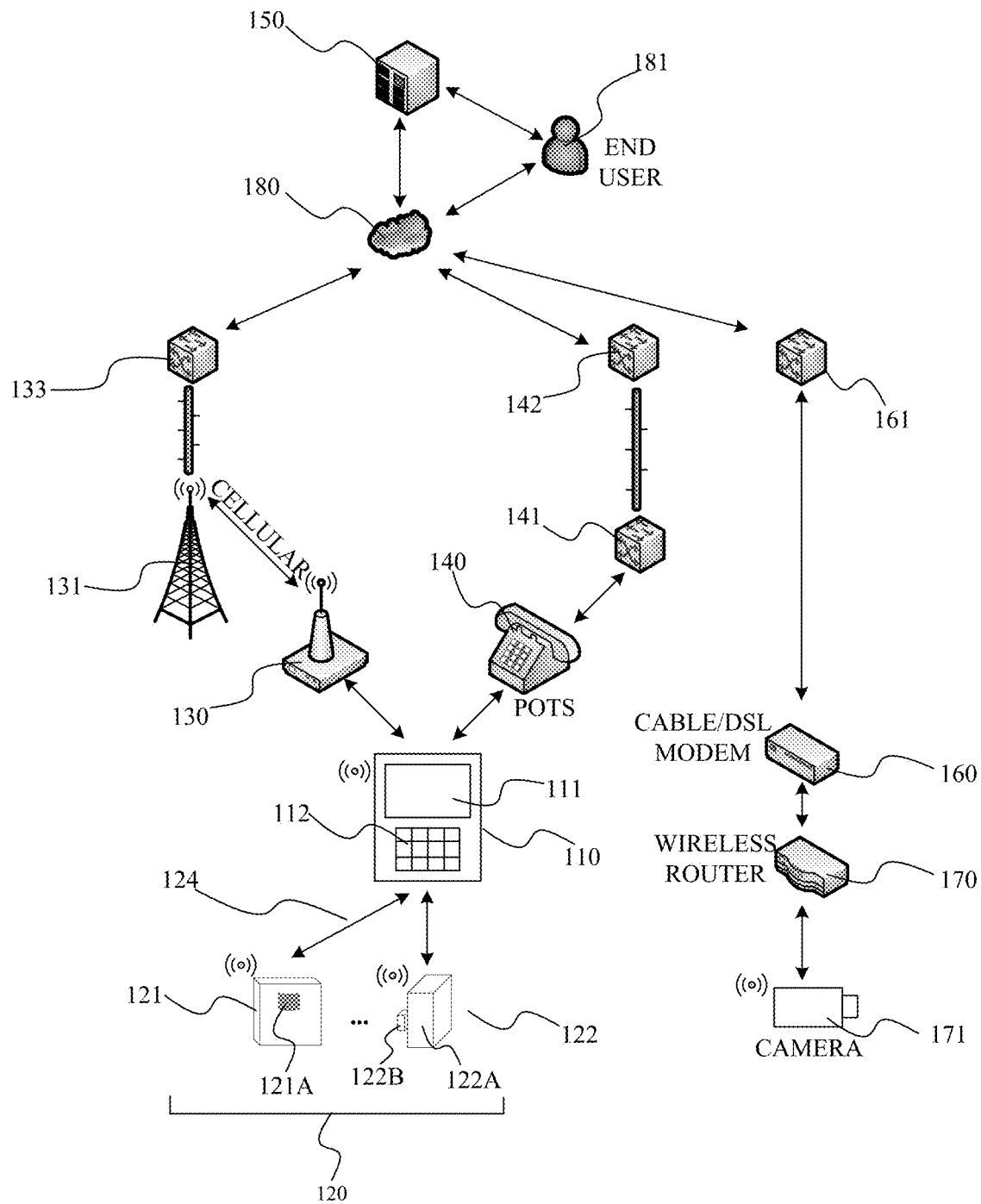
FIG. 1 illustrates prior art to make distinctions and explain the unique aspects of the embodiments described subsequently. The drawings can be used in combination with the detailed description section to understand the functionality of the illustrated embodiments.

Just to set a point of reference, the system architecture of a widely deployed home and office security system is described in FIG. 1. In commonly deployed home and office security systems the central entity that serves as the brain of the system is the security controller 110. The security controller 110 in some deployments is a piece of hardware with an LCD 111 and keypad 112 and is cognizant of the state of different sensors 120 at the property. The myriad of sensor types 120 include but are not limited to a door or window sensor 122 and a motion detector 121.

The door or window sensor 122, itself is made up of two parts. One part 122A contains a reed switch and the other part 122B is a magnet. The normally-open form of the reed switch 122A is in its OFF state when there is no magnet 122B in its proximity and operates in its ON state when in close proximity of the magnet 122B.

A typical motion detector 121 is made up of a passive infra-red (PIR) sensor that is usually covered by a Fresnel lens 121A. The structure of the Fresnel lens 121A determines the field of view that the motion detector can support.

The various sensors 120 communicate with the security controller 110 using one of many wireless technologies 124. Often times the wireless technology 124 used is a Frequency Modulation (FM), Pulse Width Modulation (PWM) or some other low level modulation based proprietary scheme. It is also equal if not more prevalent to find Z-Wave or Zigbee based wireless communication technology 124 and other RF communication technologies like Bluetooth, WLAN etc. may also be found in prior art. Security controllers 110 would then communicate with a command center 150 that may be supervised by a monitoring service. In older, but currently deployed, products this was done over landline telephone systems 140 also called Plain Old Telephone Systems (POTS). New security systems are moving towards using security controllers 110 with in-build or external cellular communication modules 130 for communicating with the command center 150. In the case of security controllers 110 that use cellular communications, the cellular module 130 sends and receives information to/from a cellular base station 131 that can handle one or many cellular technologies like 2G, 3G or 4G. This data is sent (received) to (from) the cellular infrastructure backbone 133 and eventually transferred to (from) the internet IP network 180 from where the end user 181 and the security monitoring service can selectively send (receive) data. The security command center 150 can directly communicate with the user 181 in case of an intrusion detection event.

Similar to the security controllers 110 that use cellular communications, the landline module 140 sends and receives information as circuit switched data over the public switched telephone network 141, 142 to the internet IP network 180 from where the end user 181 and the command center 150 and security monitoring service can selectively send (receive) data.

Often times the radio technologies or communication scheme 124 used between the security controller 110 and the sensors 120, is more appropriate for low baud-rate communication like commands and responses and not conducive for large data transfers. Z-Wave and Zigbee based systems are some examples. Currently deployed systems therefore use a separate wired or wireless system for capturing information over a camera 171. FIG. 1 shows a WLAN based solution where the camera 171 communicates its data over a dedicated wireless router 170 which uses the property's exiting internet connection to make the data available over the internet in a secured manner. The data thus travels from the dedicated router 170 to a modem 160 in the form of intranet IP data and then gets transferred to the modem service providers infrastructure network 161 to eventually reach the internet IP network 180. This video data can be accessed by the user 181 using any computing device and by the security command center 150 for storage and backup.

While having several merits, the current architecture harbors inherent complexity that inhibits easy self-installation and portability.

Preferred Embodiments of the System Architecture

Figure 2A:
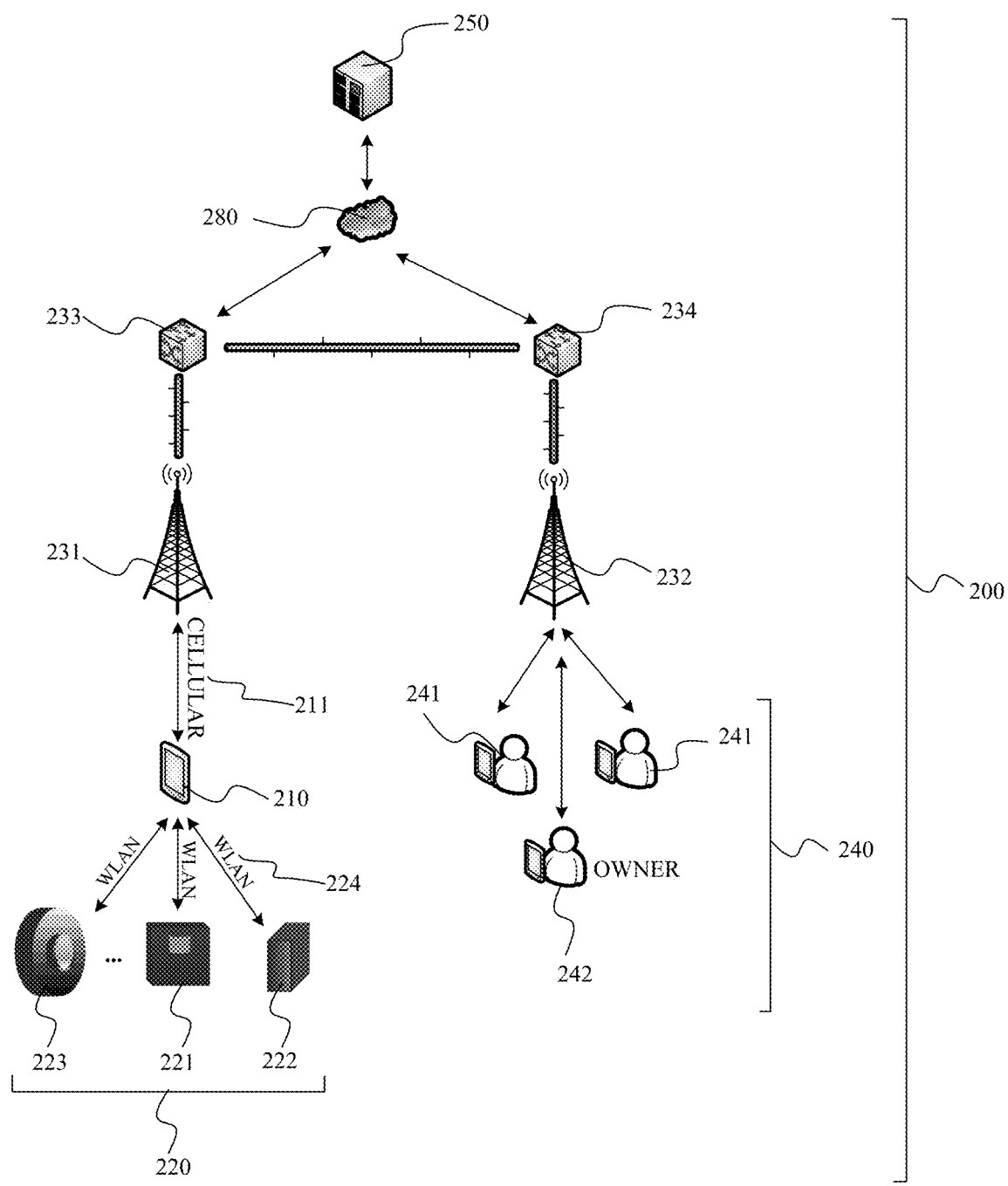
FIG. 2A shows the system architecture of one embodiment of the invention, where Wireless LAN is used to communicate between the Controller in the form of a smart phone and various sensor and actuator Modules.

FIG. 2A shows the system architecture of one embodiment of the security and automation system of the present invention. In this embodiment, the security and automation controller (Controller), which serves as the brain of the system, is a mobile device 210. Examples of communication interfaces supported by Controller 210 includes, but not limited to, IEEE 802.11x standard (WLAN) and cellular technologies etc. Hereinafter, the terms "mobile device 210" and "Controller 210" are used alternatively and interchangeably. Examples of Controller 210 may include, but not limited to tablets, hand-held or laptop devices, smart phones, television media players, smart televisions, personal digital assistants, desktop computers, or any similar devices.

Figure 2B:
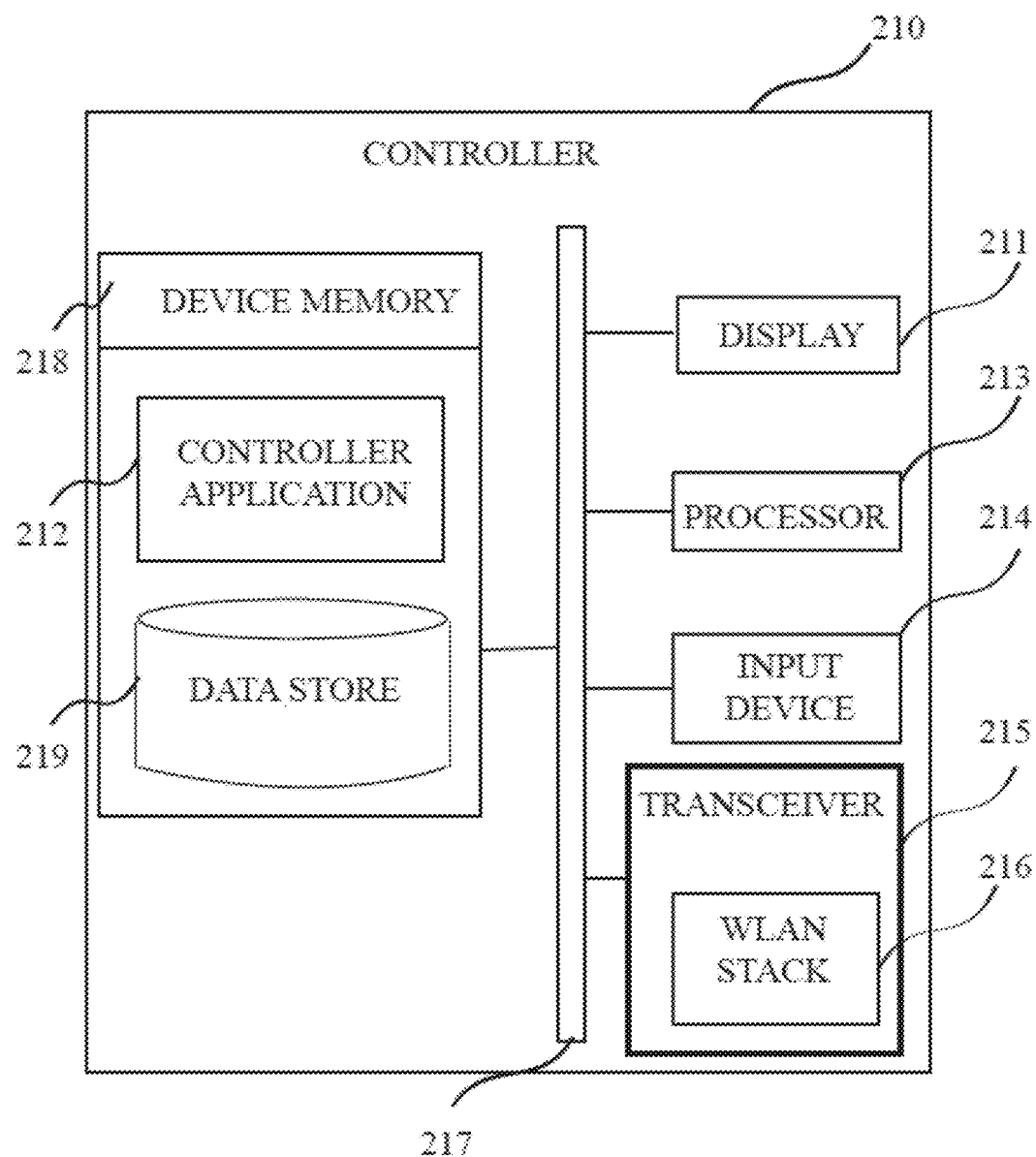
FIG. 2B shows the general architecture of a controller that operates in accordance with one embodiment of the present invention.

As illustrated in FIG. 2B, the Controller 210 may include various electronic components known in the art for this type of device. In this embodiment, the Controller 210 may include a device display 211, a processor 213, a user input device 214 (e.g., touch screen, keyboard, microphone, and/or other form of input device known in the art), a device transceiver 215 for communication, a device memory 218, the Controller application 212 installed in the device memory 218, a local data store 219 also installed in the device memory 218, and a data bus 217 interconnecting the aforementioned components. For purposes of this specification, the term "transceiver" is defined to include any form of transmitter and/or receiver known in the art, for providing one or more communication interfaces. In a preferred embodiment, the Controller 210 can act as an access point and it supports wireless communication with a plurality of other devices using same or different communication interfaces. For example and without limitation, the Controller 210, as access point, can use a wireless technology such as Wireless Local Area Network (WLAN) communication interface, a Wireless Personal Area Network (WPAN) communication interface, Bluetooth communication interface, IEEE 802.11x standard communication interface etc. By way of another example, the Controller 210 can use cellular technology such as GSM/GPRS/EDGE, CDMA/WCDMA/UMTS, LTE etc. as a communication interface. In some other embodiments, the Controller 210 can support other forms of wireless or wired communication known in the art. The transceiver 216 is also assumed to include a WLAN stack 216. Obviously, these elements may vary, or may include alternatives known in the art, and such alternative embodiments should be considered within the scope of the claimed invention.

Reference to FIG. 2B, the Controller application 212, or "app" is a computer program that may be downloaded and installed onto the Controller 210 using methods known in the art. The Controller application 212, custom built for the present invention, enables a user to do various tasks related to the security and automation system of the present invention.

In a preferred embodiment, the Controller application 212 on the Controller 210 will configure the Controller's WLAN stack 216 to operate as a software-based access point (soft AP). In some embodiments, this Controller 210 will support all the same types of sensors and actuators (Modules) 220 as supported by existing security and automation systems. A few Module types 220 viz. a simplified door or window sensor 222, a motion detector 221, motor controlled camera 223 are depicted for illustration purposes. It is to be noted that this system architecture can support a myriad of Module types like traditional door or window sensors, smoke alarms, flood sensors, lights, bulbs, curtains, other electrical devices and is not to be limited to only the Modules depicted for ease of illustration.

The Modules 220 register themselves with the Controller 210 which serves as an access point (AP) using the Controller's Service Set Identifier (SSID) and password. The Modules 220 themselves would be battery operated WLAN based embedded systems that would communicate with the Controller 210 using IP sockets and/or an RPC based communication framework. In order to allow the Modules 220 to operate on a battery for extended periods of time without maintenance, the Modules would employ a flexible sleep policy and where feasible will be put to deep sleep.

The Controller application 212, being hosted on a mobile device utilizes IP based middleware to communicate over a cellular link 225 to the nearest base station 231 which in turn would communicate the data to the IP internet 280 via the cellular backbone 233. The devices used by the owner (end user) 242 of the security and automation system and/or by a preconfigured network of owner's confidants 241 (241 and 242 together referred to as users 240) and a security monitoring service 250 can then be sent any notification events including an intrusion event via email or web services. The Controller 210 can optionally relay notifications via SMS or MMS within the cellular network between two different location areas 233 and 234 to reach the owner 242 and a notification list comprised of owner's confidants 241 and a monitoring or cloud service 250. Using the same data paths the owner 242 and optionally the same or smaller group of close confidants 241 could remotely configure or preemptively monitor the Modules.

Note that in the above mentioned illustration it is shown that the owner 242 is not at the property which is being monitored by the Controller 210. This embodiment would work equally well if the owner was at the property and their primary mobile device (like cellular phone or tablet) was being used as a Controller 210.

In the system architecture 200 of the above embodiment, note that on account of the fact that the mobile device application i.e. Controller application 212 configures the WLAN stack 216 to operate as a soft AP, there is no need for an additional router. This allows keeping the system very minimal supporting the portability, ease of use and easy installation goal of this embodiment.

It is also to be appreciated that being battery operated both the Controller 210 and Modules 220 are not just portable but insusceptible to power and telephone land line related malicious disruptions for large periods of time. It should also be noted that most mobile devices that are connected to a charger can detect a loss of power. In this embodiment of the architecture it can be seen that such an event can easily be a monitored event that can be reported to the owner 242, their close confidants 241 or a monitoring or cloud service 250 based on configurable rules described later.

Also, since the communications between Controller 210 and Modules 220 use WLAN, they are inherently protected by WLANs built in authentication and encryption.

In this embodiment, the WLAN RF technology can also be utilized to detect a RF signal jamming attempt by comparing the change in Receiver Signal Strength Indicator (RSSI) versus the Signal to Noise (SNR) change. In other words, say the RSSI for a certain channel were to become very good but the SNR were to drop versus normal conditions—such an event could be indicative of normal interference or a jamming attempt. One could define a mathematical model of change in RSSI versus SNR compared to normal conditions leading to detection and eventual notification of jamming attempts. Mobile devices like cellular phones are great for communicating such an event due to the presence of two or more RF technologies that can coexist and operate at very different frequency ranges.

Another embodiment of the System Architecture 200 may utilize WLAN's peer-to-peer connectivity (WiFi Direct) for communicating between the Controller 210 and Modules 220, as an alternative to the Controller 210 being in Soft AP mode and Modules 220 in STA (station) mode.

Preferred Embodiments of Methods

Various methods can be employed to supplement the embodiments of the system architectures, to realize a security and automation system. For purposes of a detailed description of the preferred embodiments of methods, the embodiment of system architecture described in FIG. 2A is being used in a non limiting manner.

Before the Modules 220 can start communicating with the Controller 210 which will be configured as a WLAN soft AP in normal mode, the Modules 220 would need to have the Controller's 210 SSID and password to attach themselves to the Controller's 210 intranet. The method by which the SSID and password is securely and simply exchanged is being described as the discovery and enrollment process illustrated in FIG. 3. Note that this method is intentionally designed not to need any other entities outside of the Controller 210 and Module 220 to realize the portability, simplicity and ease of installation aspect of the embodiment thus described.

In order to begin this process, reference to FIG. 2B, FIG. 3, FIG. 12 and FIG. 13, the Module 220 is turned on, if not already in that state and a discovery switch 1220 provided in the Module 220 would be pressed as in step 340. The discovery switch 1220 could be a tactile switch, a momentary button press switch, a GUI based software switch or some other form of switch. At the time the discovery button 1220 is pressed, as in step 340, the embedded microcontroller 1210 of the Module 220 would recognize this event and configure the embedded WLAN stack 1230 in soft AP mode as in step 342 and the embedded software would look for connection requests with a factory programmed SSID and password. At this time the Controller's 210 GUI on display 211 can be operated to enter the configuration on screen as in step 310, where the Controller application 212 would perform a WLAN scan to search for Access Points as in step 312 within its vicinity. The Controller 210, at this point, would be configured in STA (station) mode for purposes of this scan and the list of devices i.e. modules 220 displayed could be optionally filtered to find only Modules handled by the security and automation system of the present invention. Being within range, the Module 220, which is in discovery mode and serves as a Soft AP, would show up as an accessible AP in the filtered scan list on GUI of Controller application 212 on display 211. The Module 220 would be productized with information (user manual or sticker on device) which would list the Module name and password programmed at the factory. The user would then select, as in step 314, the Module 220 from a list displayed on the Controller's GUI, identified by its SSID (Module name). Upon selection of the Module 220 the user will be challenged to enter the password, which they would retrieve from the factory programming information of the Module 220. Upon completion of the above step, the Controller 210 would connect to the Module's soft AP as in step 316 and the Module 220 would accept the connection request as in step 344 after confirming that the correct SSID and password were communicated. After this, the Module 220 would start a server socket as in step 346 and would wait for connection requests to that server socket. After the WLAN connection has been secured, the Controller 210, which is now in STA mode, would send its own username/password as in step 318. This username and password of the Controller 210 would be stored in an encrypted form. The procedure will then end with the Module 220 confirming the receipt of username and password as in step 348 and the Controller 210 displaying a message confirming the addition through its GUI as in step 320. After the procedure ends at the Controller 210 as in step 322, the Controller 210 would transition from STA mode to Soft AP. The end of this procedure as in step 350 at the Module 220 would result in a reset.

It is to be appreciated that for all the communication, the WLAN standard's security features are utilized to realize a safe and secure system.

Other embodiments of the discovery and enrollment process could use different underlying wireless or wired technologies where the communication link can be encrypted and made secure using Transport Layer Security (TLS) and similar methodologies. In fact, even in the embodiment shown in FIG. 3, the Controller 210 and Modules 220 may optionally further encrypt the communication between them using TLS or similar methodologies.

Figure 4:
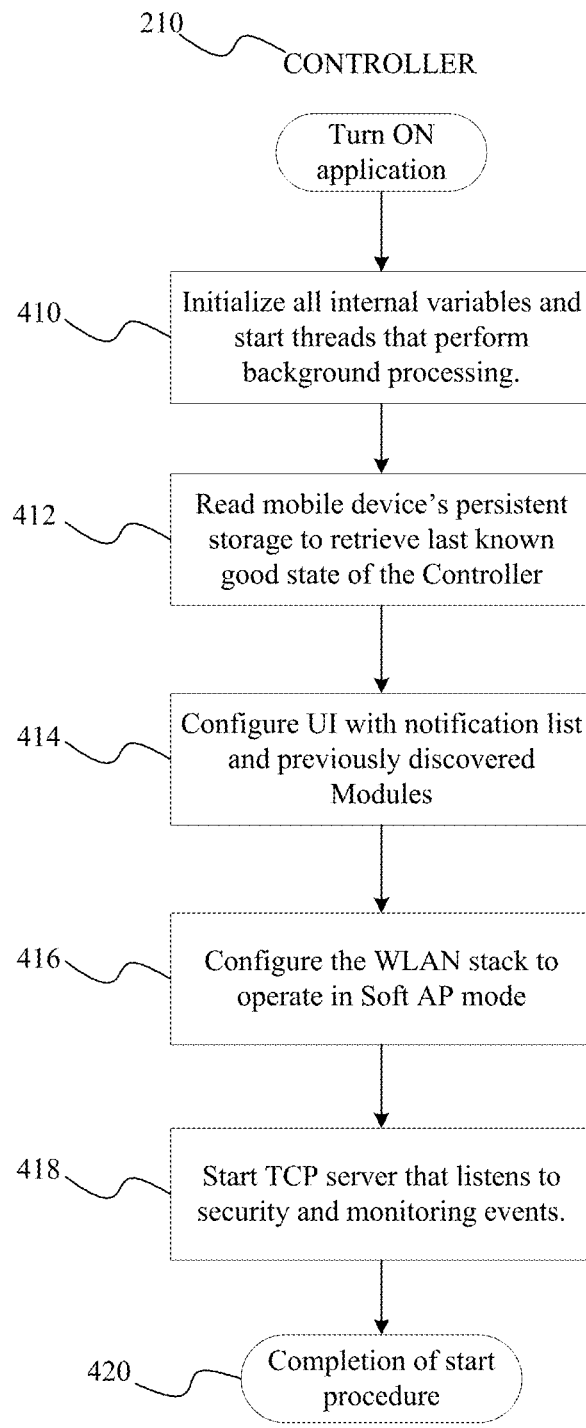
FIG. 4 shows the start-up procedure of the security and automation Controller.

FIG. 4 shows the startup procedure of the Controller 210. We may need to go through the startup procedure, if the user is configuring the system for a new setup, or if the user intentionally or unintentionally turned the Controller 210 application off. This startup procedure may also need to be performed in the event of a Controller reset, operating system upgrade or crash. In these cases when the Controller application 212 is first turned on, the Controller application 212 would perform any state initializations and start background threads that listen to asynchronous events or perform any background processing as in step 410.

Following the above mentioned initialization stage, the Controller application 210 would read persistent storage to figure out the last good state of the application as in step 412. This would include retrieving information of all the previously discovered Modules 220 and also a notification list which includes contact information of owner's confidants 241 and, optionally, a security monitoring service 250 previously configured. Once this information is retrieved it is also populated as in step 414 to the GUI components on display 211. At the completion of these steps the Controller application 212 would configure the WLAN stack 216 to operate in Soft AP mode as in step 416 and start a socket server as in step 418 to listen to security and monitoring events. The socket server could be listening on the same interface as the gateway of this newly created intranet where the Controller 210 is now the Access Point (AP). The newly started socket server as in step 418 would now listen for events coming from Modules 220 on account of a security or monitoring event or configuration request coming from the owner 242.

At the completion of this procedure as in step 420 the Controller 210 can be armed or left in disarmed state. In its disarmed state a security event would either result in an audio notification or go silently, depending on the Controller's 210 configuration options. In the armed state however the same event would lead to a specific notification list getting an alarm or event indication as the case might be.

After a Module 220 has been enrolled to the Controller's 210 network, it is reset to operate in its normal mode. In its normal mode, Modules 220, in one of their embodiments, will employ an aggressive but selective sleep methodology to conserve battery resources. This embodiment is described in FIG. 5. In this illustration one can note that Module's 220 embedded system, configures itself as an STA and joins the Controller's 210 network as in step 540. The Controller 210 allows the enrollment of the Module 220 to its intranet after it authenticates the Module as in step 510. Once the Module 220 has joined the network the first time, it will check to see if a more aggressive deep sleep mechanism can be followed as in step 542. Typically deep sleep will be possible for Modules 220 that have simple use cases where in most common cases the module initiates communication with the controller. In these common use cases the Controller 210 only needs to respond back with a positive or negative acknowledgement. While this may sound limiting, it is actually quite appropriate for a variety of sensor Modules 220. Even in this limited communication scheme when deep sleep is configured, an embodiment of the sleep aware communication scheme facilitates the commands to be sent in the opposite direction from Controller 210 to Modules 220 using a piggybacking scheme described later in FIG. 7. The Module 220 may find out its sleep policy based on configuration data stored in persistent storage or based on command signaled from the Controller 210. The Controller 210, in the latter case, would base the sleep policy on capabilities of the Module 220 and Controller 210.

The term "deep sleep policy" is used herein to refer to a "first sleep policy" for the modules, implementation of which shuts off one or more components of the modules including external communication channels to save power. As a result, implementation of deep sleep policy may make the modules incommunicable to external devices including to the controller unless the modules initiate communications themselves. For example, if for a particular Module 220, deep sleep is allowed, the embedded software of the Module 220 will turn off the WLAN chipset 1230 and parts of the microcontroller as in step 552, only leaving some hardware components active to look for events. These active hardware components could then wake up the rest of the system to process this wake up event. For example, in case of a traditional door or window sensor, the closing of the reed switch could wake up the microcontroller 1210 which in turn would wake up the WLAN chipset 1230.

On the other hand, if a Module 220 needs two-way communication between the Controller 210 and the Module 220 on a regular or semi-regular basis, a less aggressive sleep policy may be employed. This less aggressive sleep policy is in the form of a timed sleep. The term "less aggressive sleep policy" is also hereinafter referred to, alternatively and interchangeably, as "second sleep policy". Unlike first sleep policy, implementation of second sleep policy does not make the modules turn off any component indefinitely. Rather, the second sleep policy ensures that the modules wake up from sleep at predefined intervals of time irrespective of occurrence of any event. In this case the Module 220, which is the STA sets the Power Management bit in its data frame sent to the Controller 210 as in step 532 for any upcoming communication or preemptively sends a Null Frame with the same. This process indicates to the AP i.e. the Controller 210 that it should buffer any unicast frames for the requesting STA as in step 512. The STA, in this case the Module 220, then goes to sleep as in step 533, after setting a timer interrupt. At the triggering of the timer interrupt the Module 220 wakes up as in step 534 to check the AP beacon to see if there are any frames buffered for it to consume as in step 535. If no buffered frame is found as in step 536, the Module 220 goes back to a timed sleep as in step 533. However, if there are frames buffered for the STA as in step 536, the STA enters a Power Save (PS)-Polling, hereinafter referred as PS-Poll, procedure as in step 537, where the Module (STA) 220 sends a frame with the PS-Poll bits set. The AP i.e. Controller 210 then responds back with the buffered frames and optionally sets the More-Data bit if all the buffered data frames have not been read, at which time the STA 220 can resend a PS-Poll frame.

Figure 5:
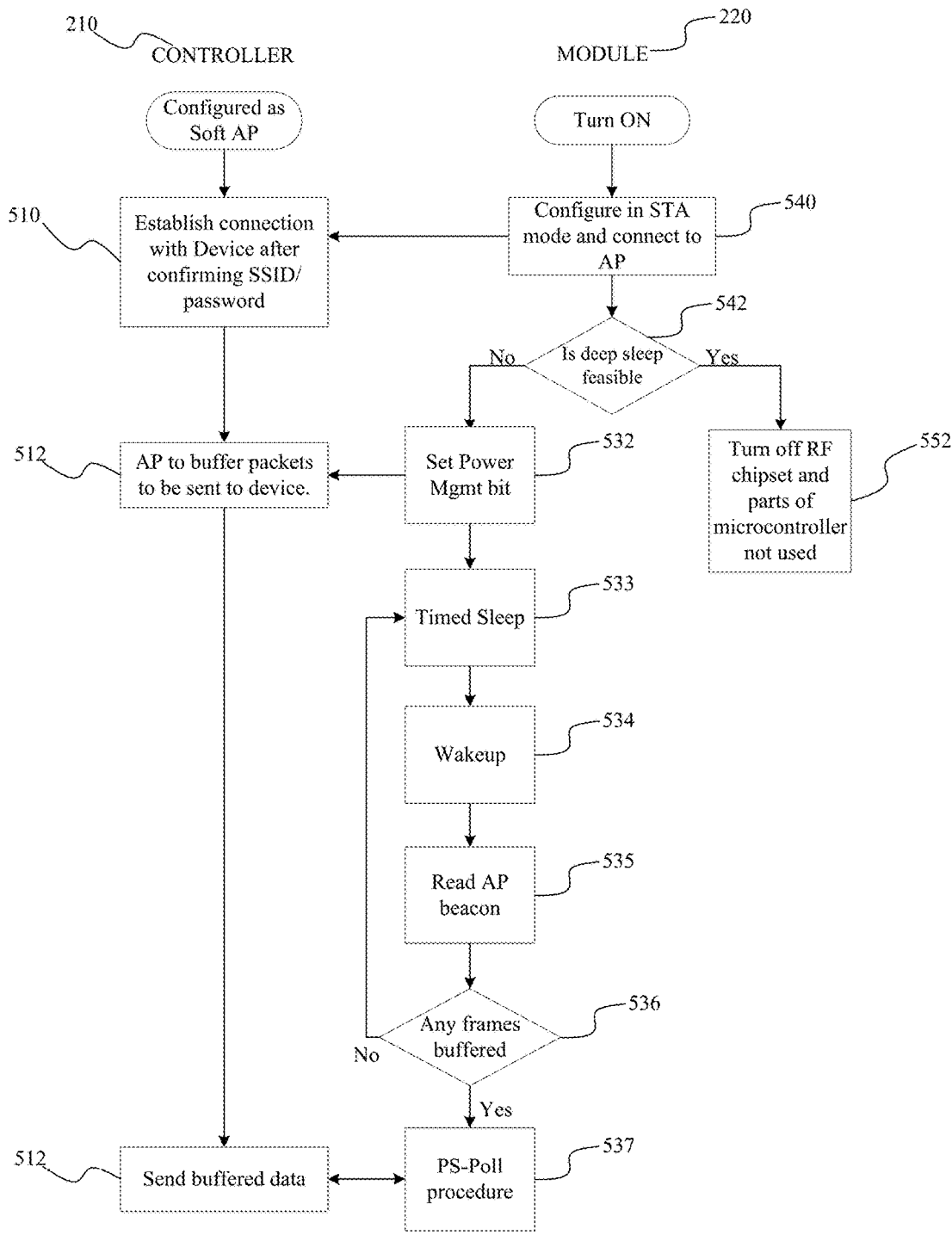
FIG. 5 shows a selective sleep procedure for reducing battery consumption in Normal Mode of one embodiment of a Module.
Figure 6:
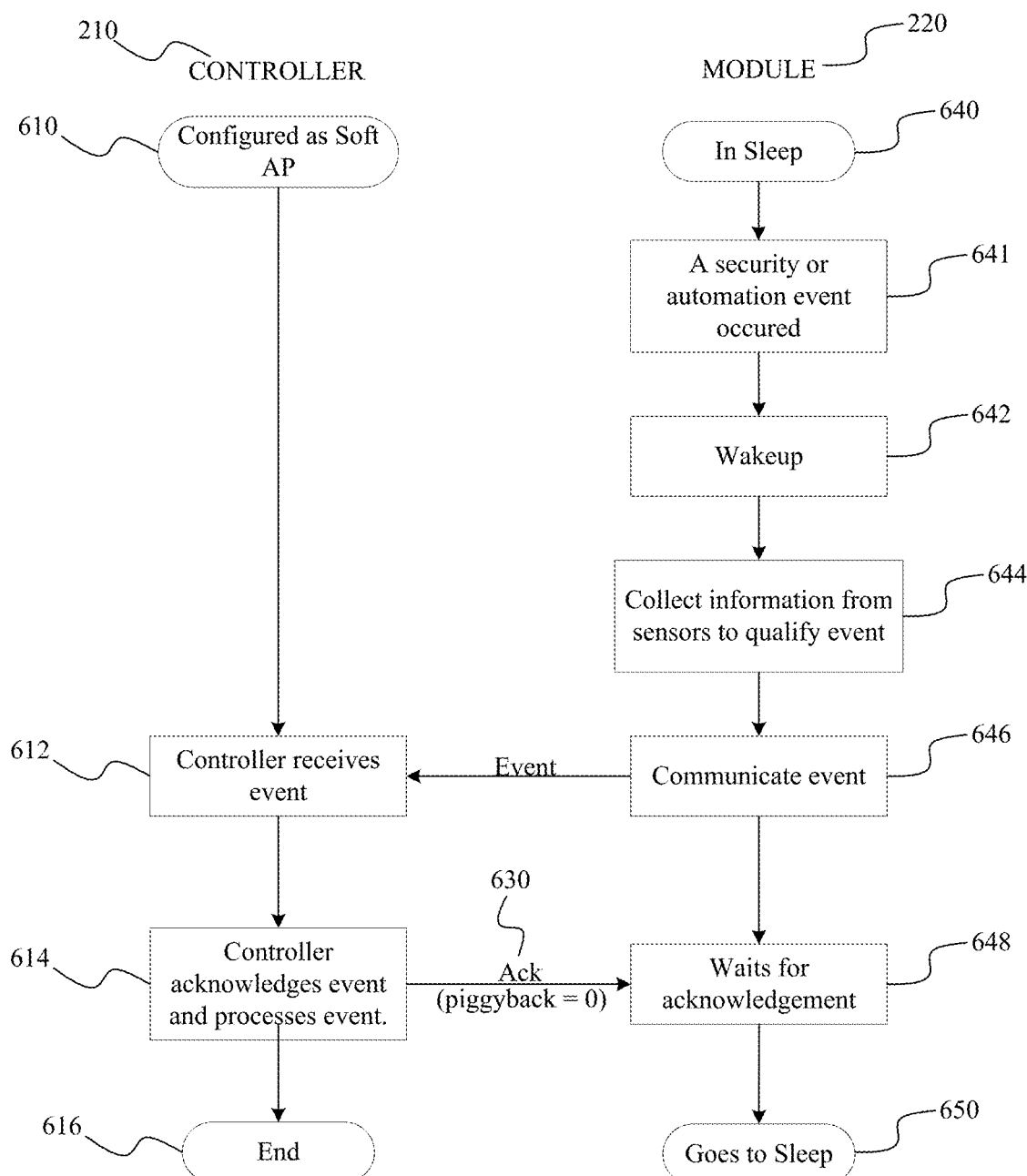
FIG. 6 shows the wakeup procedure for a Module not needing piggybacked commands from the Controller.

So as shown in the embodiment of the selective sleep procedure of FIG. 5, the Module 220 spends most of its real-time in Normal mode in one form of sleep. This is by design to conserve valuable battery resources. Most Modules 220, which inherently are embedded systems with one or more sensors and/or actuators, would also need to wake up to serve their purpose. For example, a camera module, would need to wake up upon change of scenario, a door and window sensor module would need to wake up at the time a door or window is opened or closed. FIG. 6 describes one embodiment of the wakeup procedure for a Module 220 that is either not employing deep sleep or one that can be operated without stimulus from the controller once it initiates its deep sleep procedure. FIG. 6 shows that at the start of this procedure, as in step 640, the Module 220 is in sleep and has previously connected with the Controller 210 that is configured as a Soft AP as in step 610. Even in sleep a minimal part of the embedded system of the Module 220 is awake listening for events. The event can be any security intrusion or an automation event like change in temperature, detection of motion etc. At the occurrence of the event as in step 641, the embedded microcontroller 1210 wakes up as in step 642 to further qualify the event by acquiring additional data from itself or by communicating with other Modules 220 via or independently of the Controller 210 as in step 644. After the Module 220 has ascertained that the event needs to be communicated to the Controller 210, it sends a message to the Controller 210 as in step 646. Once the Controller 210 receives the message as in step 612, it will acknowledge the receipt and take an action found necessary as a result from processing all the state information through its rules-engine as in step 614. However knowing the nature of the Module 220, it leaves the piggyback parameter, in the acknowledgement, configured off as in step 630. The Module 220 which is waiting for the acknowledgement as in step 648, upon receiving the response with piggyback parameter off, goes back to sleep as in step 650.

Figure 7:
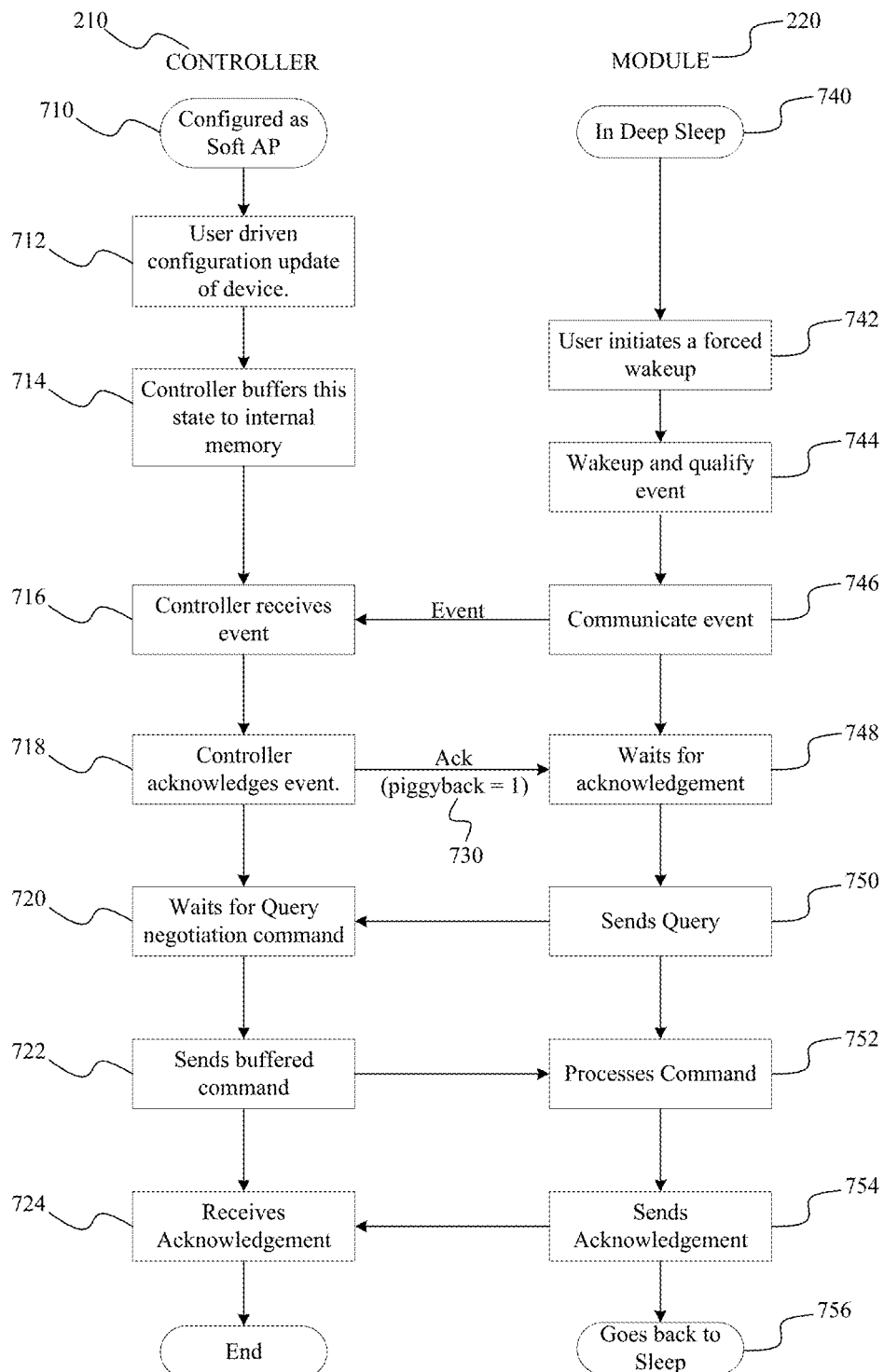
FIG. 7 shows the update procedure for a Module that supports piggybacked commands from the Controller.

In the case of Modules 220 that will go to deep sleep and still need to receive asynchronous commands from the Controller 210 in one of its embodiments described in FIG. 7, the communication process uses a piggybacked scheme for sending such commands. Note that Modules 220 that are configured for deep sleep are typically devices that don't need any stimulus from the Controller 210 except in rare cases where some configuration or state information needs to be updated. In these cases it is reasonable to expect that the stimulus from Controller 210 to the Module 220 is user driven and owner 242 has physical access to both the Controller 210 and the Module 220. This procedure will be hereafter referenced as an update procedure and mode.

At the start of FIG. 7 the Controller 210 is in a known ON state and configured in Soft AP mode as in step 710, whereas the Module 220 is in Deep Sleep as in step 740. In this situation the owner 242 initiates a supported configuration change of the Module 220 from the Controller 210 as in step 712. The Controller 210 realizing that the Module 220 is configured to be in deep sleep, buffers the configuration request rather than sending it to the Module 220 immediately as in step 714. At this time the user accesses the Module 220 and triggers it by actuating a button or by tapping it or by forcing it to trigger on the security or automation event that the Module 220 tracks as in step 742. For example, in case of a motion sensor module, the user can move in the sensors field of view after initiating the procedure at the controller 210. The Module 220 then wakes up and further qualifies the event as in step 744 before communicating the event to the controller 210 as in step 746. The controller 210 being cognizant of the update procedure being performed on the Module 220, may ignore the received event as in step 716 (especially in case the Module 220 does not have a way of distinguishing an update procedure from a normal security/automation event). The Controller 210 then acknowledges the event as in step 718 but sets a piggyback parameter in the acknowledgement response as in step 730. The Module 220 on receiving this acknowledgement as in step 748 with piggyback parameter, now recognizes the update procedure. At this time rather than going to sleep, the Module 220 sends a query command as in step 750. Upon receipt of the query command as in step 720, the Controller sends the originally buffered update command to the Module as in step 722. The Module 220 receives and processes this update command as in step 752, sends an acknowledgement for the command as in step 754 and goes back to sleep as in step 756. The Controller 210, on the other hand, receives the acknowledgement and ends the procedure as in step 724.

Preferred Embodiments of Devices and their Methods—Controller GUI.

Figure 8:
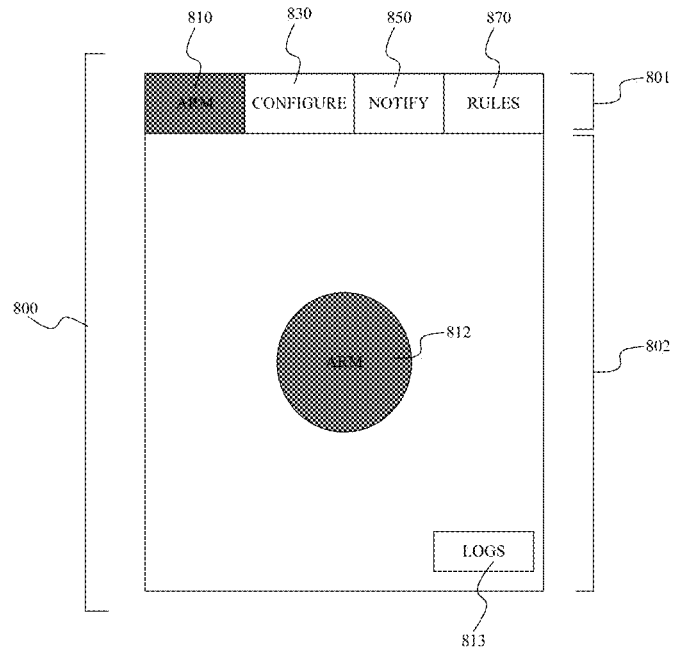
FIG. 8 shows one embodiment of the Graphical User Interface (GUI) components that facilitate arming and disarming of the Controller.

FIG. 8 describes one embodiment of a typical screen on display 211 of the Controller's 210. The GUI elements of the Controller application 212 in the following paragraphs are only shown for illustration of the Controller's 210 methods and functionality and in different embodiments may display different GUI elements or could be organized differently.

The GUI 800 of the Controller application 212 would enable a user to perform many high level functions depicted by tabs 801 provided at the top of the GUI 800 whereas the remaining area 802 depicts details or sub-functions of the selected high-level function. One such function is the arming and disarming of the security and automation system through tab 810. Other tabs includes configuration tab 830, notification list tab 850 (a notification list is made up of the owner's confidants 241, security monitoring service 250 etc.) and a Rule generator and editor tab 870 to allow making user configurable security and automation scenarios.

FIG. 8 shows the state of the GUI 800 when the Controller application's 212 arm function is selected. The sub-function area 802 of GUI 800 of Controller application 212 for the Arm function shows a simple button 812 which can be used to arm and disarm the system. Disarming may optionally prompt the user to enter a preconfigured alpha-numeric password, a numeric code or a touch-screen pattern. In its armed state, the Controller 210 is in a state where at the occurrence of a security or monitoring event from a Module 220, a specific notification list gets indication of the event. In the disarmed state, the same event could result in a different outcome. Another system sub-function in this embodiment would be to view the system logs 813 which show the date, time and events handled by the Controller 210.

Figure 9:
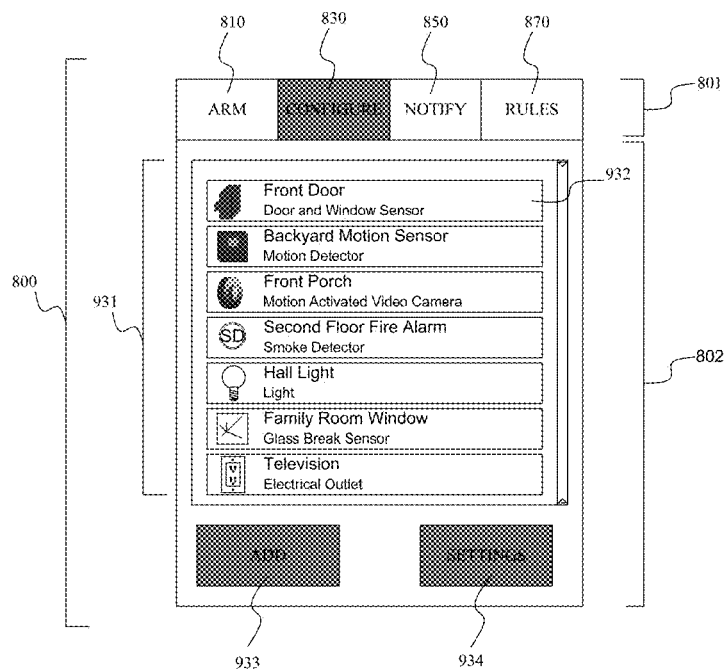
FIG. 9 shows one embodiment of the GUI components that facilitate adding a new Module to the Security and Automation System, its management and configuring the settings of the Controller.

In the above described embodiment of the Controller application 212, another function that the GUI 800 of the Controller application 212 will allow is the ability to configure the system through the configure tab 830. This is depicted in FIG. 9. A sub-function under the configure tab 830 is to add a new Module 220 through Add tab 933. Adding a new Module 220 requires execution of the procedure described in FIG. 3. Once a Module 220 has been added its record 932 gets appended to the list of previously added Modules 220 shown under 931. At the time of addition, the operator of the controller application 212 will be given an option to name the Module 220 to a specific name that will allow the user to recognize it easily. The named Module will then show this name and the type of the Module either pictorially or in words as shown in 932. Another sub-function of the Configure tab 830 is to update setting through Settings tab 934 of the Controller 210. These setting under Settings tab 934 may include the Controller's local SSID and password, SMTP configuration, default email and SMS messages, application permissions like capturing GPS coordinates or enabling/disabling taking camera pictures at time of an intrusion event, Alarm audio etc.

Figure 10:
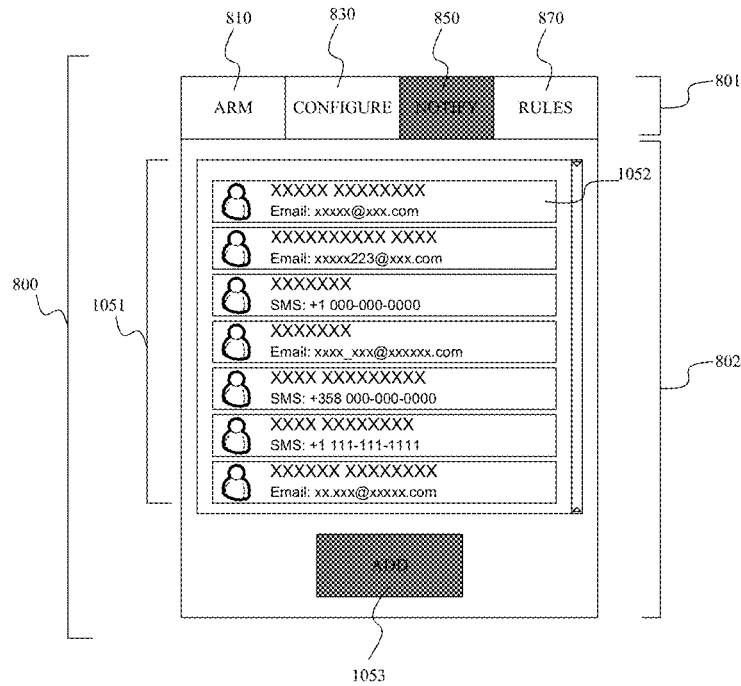
FIG. 10 shows one embodiment of the GUI components that facilitate adding and updating a notification list for one or many of the Modules.

In the above described embodiment of the Controller application 212, the owner will be able to select the Notify tab 850 function as shown in FIG. 10. This function allows adding, deleting and updating a notification list 1051 as its sub-functions. Deleting and updating, in one embodiment of the Controller application 212, can be performed by selecting the record on a touch screen, the record can be added by clicking on a button 1053. Each record 1052 of the Notify list would contain a name, email or phone number for SMS, automated or manual phone call, a list of Modules and/or events being monitored etc. On account of this configuration, when a security or automation event occurs, based on the Module or event configuration, one or more notification records will be serviced. This would mean that one or more email addresses will be sent a notification and/or one or more SMS messages will be sent. Optionally one or more phone numbers may be sequentially dialed and an automated voice message relayed. Optionally set of phone number can be dialed so they can communicate with the owner of the system in a semi-automated manner. Optionally an external service can be utilized to dial multiple numbers of the user's confidants where everyone can be patched to the same phone call, so the user can seek assistance in case of an emergency.

Figure 11:
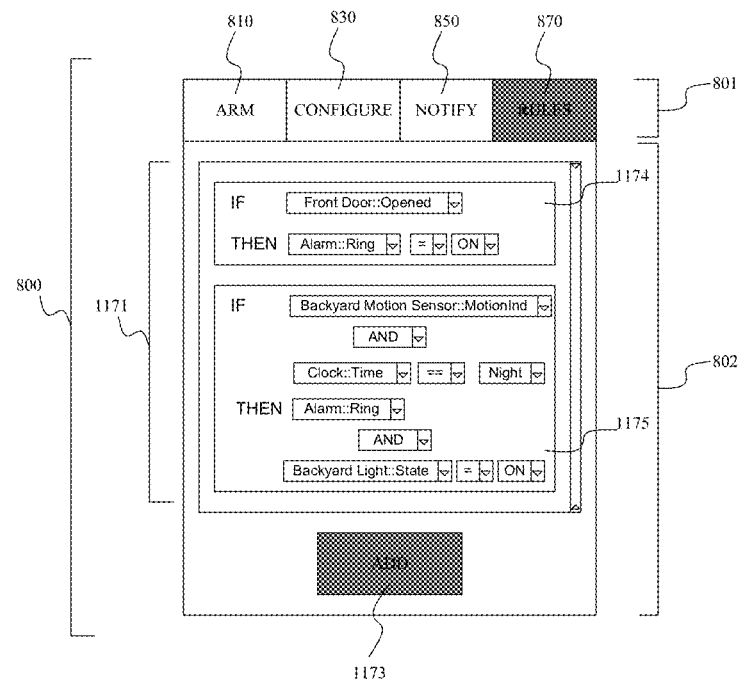
FIG. 11 shows one embodiment of the GUI components that facilitate managing the rules for sensing and controlling Modules in the purview of the Controller.

In the above described embodiment of the Controller application 212, the owner will also be able to configure a Rules function 870 as shown in FIG. 11. The Rules functionality will be run by a back-end engine in the Controller 210. The user will be able to add new rules by selecting the Add function 1173 and configure various logical conditions as illustrated in the records 1174 and 1175. The user will be able to update and delete records through GUI options displayed by selecting a record like 1174.

Preferred Embodiments of Devices and their Methods—Module.

Figure 12:
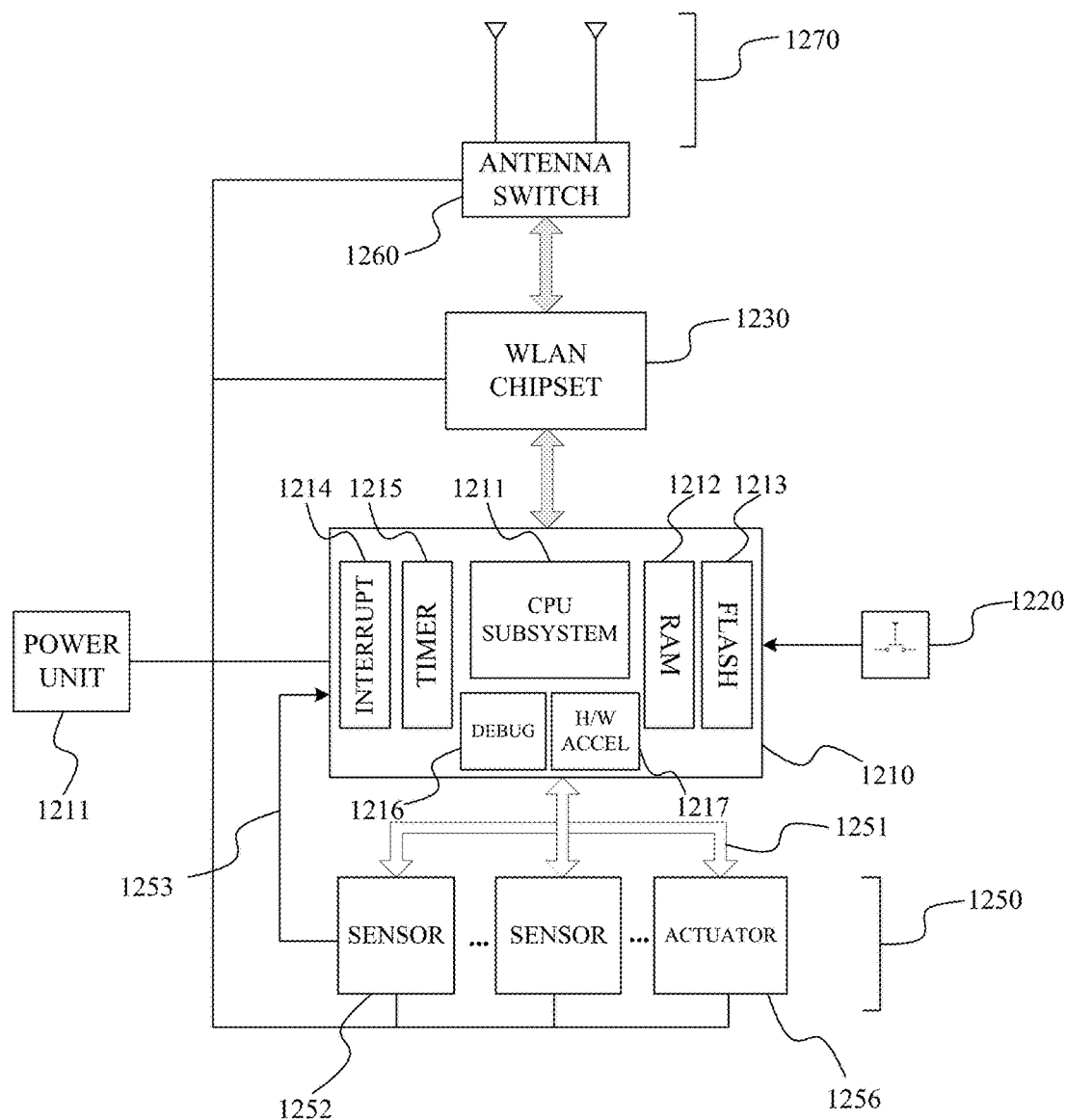
FIG. 12 shows one embodiment of the Module's hardware architecture that enables portability, simplicity of use and ease of installation.

FIG. 12 describes one embodiment of the hardware architecture of a Module 220 which inherently is an embedded system with a processing unit 1210. The processing unit 1210 includes one or more hardware modules and/or one or more software modules. In a preferred embodiment, the processing unit 1210 is a microcontroller or System on Chip (SoC) 1210. The microcontroller or SoC 1210 contains a CPU subsystem 1211 with one or more CPU cores, caches etc., an interrupt controller 1214, a timer module 1215, internal random access memory 1212, internal flash 1213 and any application specific hardware accelerators 1217 where needed. The above described embodiment of the Module's hardware architecture would also contain wireless artifacts like a WLAN chipset 1230, an antenna switch 1260 and one or more antennas 1270. Additionally this embodiment may contain one or more peripheral devices that would communicate with the Microcontroller or SoC 1210 over a peripheral access bus like SPI, I2C etc. or via general purpose input output (GPIO). Common peripherals for a Module would be sensors 1252 and actuators 1256 for resolving security and home automation use cases. The peripherals 1250 may also have the capability to interrupt the microcontroller 1210 through signal 1253. This kind of functionality, in the above described embodiment, will allow most of the illustrated hardware blocks of Module 220 to be in power saving or sleep mode while only one or a few of the peripheral devices stay awake and interrupt the microcontroller 1210 to wake up at an appropriate time. Also shown in the illustration is a power unit 1211 and a discovery switch (like a tactile switch) 1220 to allow the Module 220 to enter into discovery mode.

Figure 13:
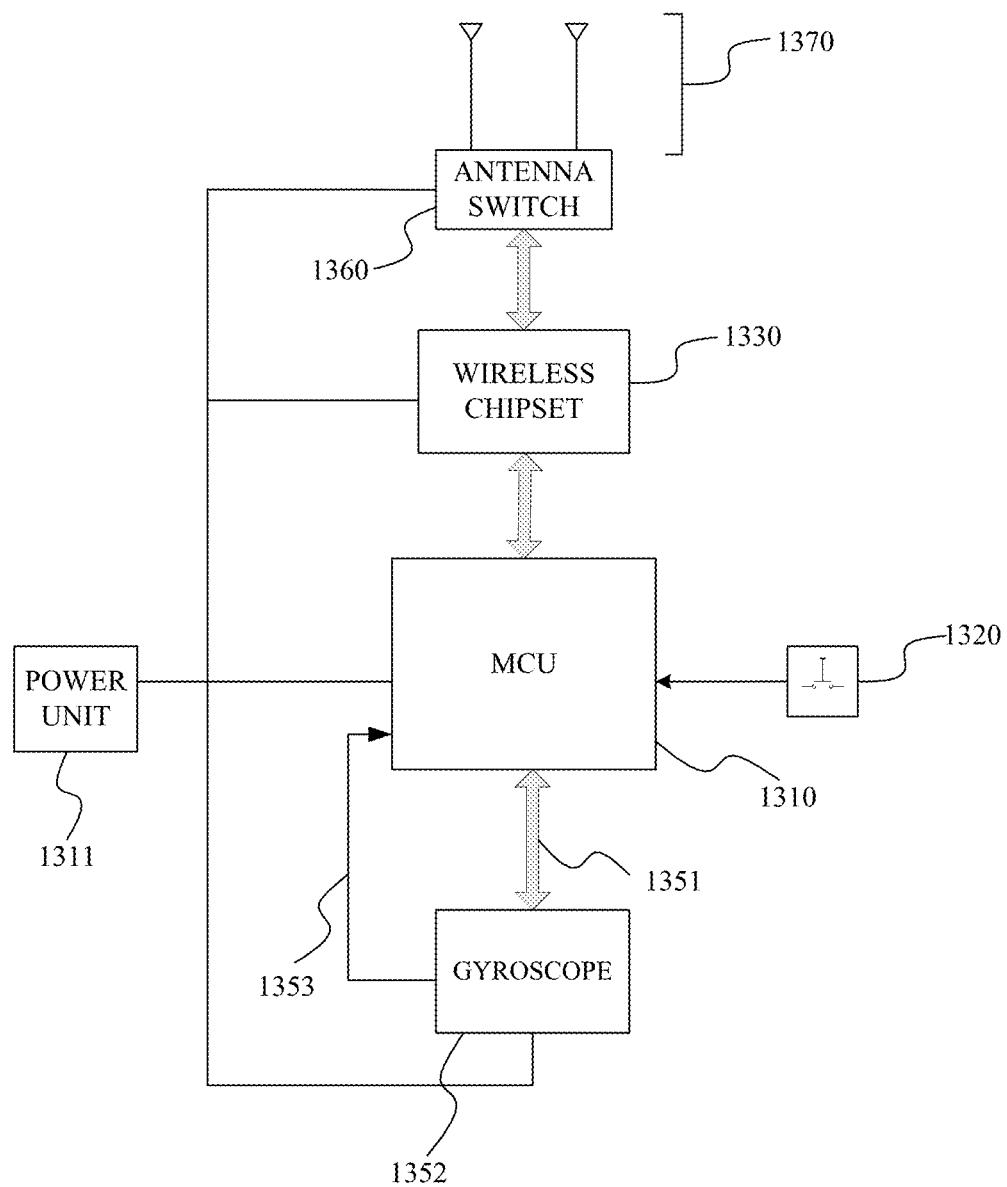
FIG. 13 shows the hardware architecture of a simpler embodiment of a door and window sensor Module.

A simpler version of the Module's hardware architecture can be realized into an alternative embodiment of a door or window sensor device, as shown in FIG. 13. For example, here an off-the-shelf RISC (reduced instruction set computer) architecture microcontroller, such as ARM based microcontroller can be used. An ARM based microcontroller 1310 in combination with a gyroscope 1352 would serve the purpose of detecting a radial door or window movement. In this embodiment of the Module the motion detection algorithm could be implemented in software running on the ARM based microcontroller 1310. The gyroscope 1352 would be responsible for waking up the Microcontroller Unit (MCU) 1310 by means of an interrupt 1353 upon detection of any motion above a certain threshold value. The MCU 1310 in turn would then read the angular velocity samples ($\Omega x$, $\Omega y$, $\Omega z$) from the Gyroscope 1352 over an SPI or I2C bus. The MCU 1310 would then integrate the samples over time to calculate any angular change in orientation. In the case where the MCU 1310 calculates a change in orientation above a certain noise threshold (say 1 degree), it will qualify it as a legitimate door movement and send a alert over the wireless chipset 1330 that can use any wireless technology like Z-Wave, WLAN etc.

To describe the algorithm, one can consider the angular velocity samples obtained from the gyroscope to be the change in angle over change in time. The digitized samples from the gyroscope however would need to be multiplied with its unit or in other words the angular velocity equivalent of the least significant bit (LSB).

So in other words, $$\text{angular velocity,} \quad \Omega \cdot LSB = \frac{\Delta\theta}{\Delta t}$$

$$\Delta\theta = \Omega \cdot LSB \cdot \Delta t$$

Where $\Delta\theta$ is the change in angle and $\Delta t$ is the sample time
Now, on integrating both sides over N samples, one would obtain the Angular movement, $\theta = \tau_{n=0}^{N} \Omega \cdot LSB \cdot \Delta t$ In the above described algorithm, the absolute orientation is not as important as the relative change in angle from the time the system is woken up. Therefore, this algorithm would not be susceptible to angular drift as is typically experienced by gyroscope based orientation detection systems.

In another embodiment an accelerometer can be used for waking up the system whereas the gyroscope can be used to calculate the radial orientation change.

In yet another embodiment the accelerometer data can be processed to detect linear translation movements as are typical for sliding door and windows.

While the above embodiments can serve specific needs for detecting patterns (like that of door movements), there is a need for a scalable and generic system that can detect a plurality of motion patterns needed in the home security and automation domain.

Figure 14:
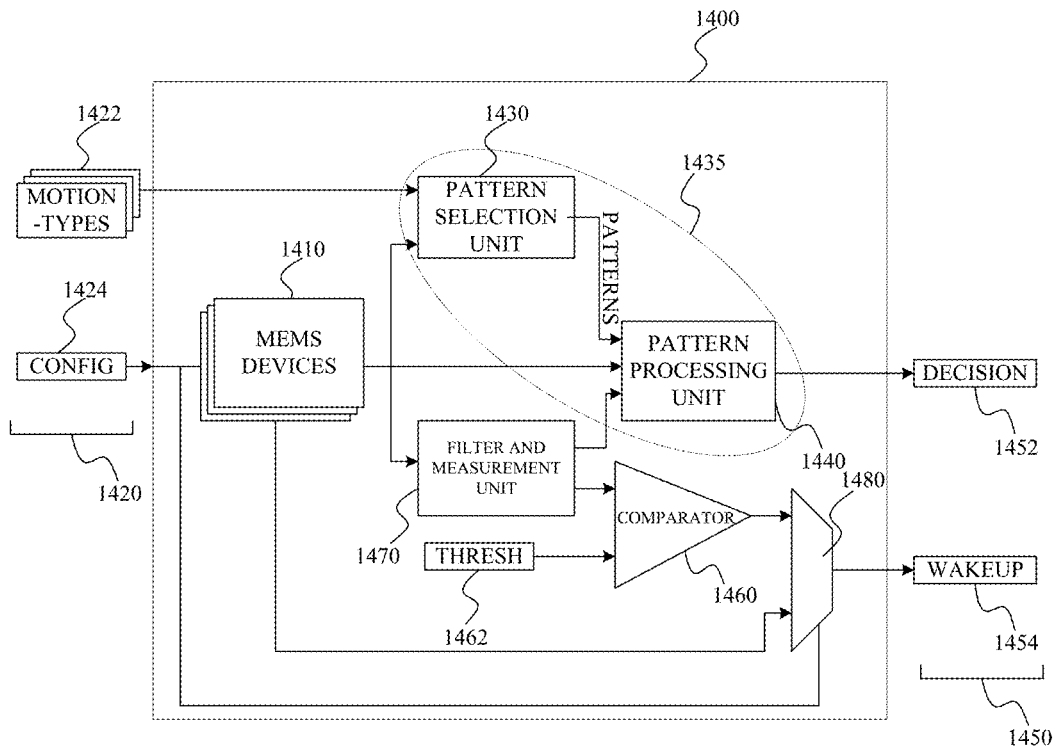
FIG. 14 shows one implementation of the Inertial Signal Processing Unit that can be used in an embodiment of a Module that needs to sense motion and/or orientation data.

FIG. 14 shows one embodiment of an Inertial Signal Processing Unit (ISPU) 1400 that can be used in a security and home automation Module that needs to detect motion and orientation information. One application of this embodiment, without limitation, is to be used in a door and window sensor Module like 222 (in FIG. 2). In this embodiment the various components described in FIG. 14 could either be implemented in one or more hardware modules and/or in one or more software modules included in the processing unit 1210 of FIG. 12. For example, the components of FIG. 14 can be implemented either in the hardware accelerator 1217 (FIG. 12) or in the software executing on the CPU 1211 (FIG. 12) or in a combination of both. The ISPU 1400 takes user input 1420 in the form of configuration data 1424 to configure a plurality of MEMS devices 1410 or a set of Motion-Types 1422 that the ISPU 1400 needs to track. Continuing to use the example of the door and window sensor 222, in a non-limiting way, the MEMS devices 1410 could be a 3-axis accelerometer and 3-axis gyroscope and typical configuration data could be the full scale range of the accelerometer for example 2 times gravitational acceleration constant (g), the full scale range of the gyroscope for example 250 degrees per second. Some Motion-Types 1422 with relation to the door and window sensor embodiment could be sliding motion of a window or door, radial movement of a door or window, knocking and tapping motions etc. In this embodiment the user should be able to enable one or many Motion-Types 1422. The ISPU 1400 would then process the inputs 1420 and use that in combination with its internal sensor data to produce some outputs 1450. One output would be a decision 1452, which indicates if the ISPU 1400 detected one of the enabled Motion-Types 1422. The ISPU 1400 can also output a Wakeup signal 1454 indicating the occurrence of interesting sensor data. The reason for a Wakeup signal 1454 is that at anytime, for purposes of conserving battery, the battery consuming parts of the overall system (as described in FIG. 12) including parts of the ISPU 1400, can be turned off. Then triggering off the Wakeup signal 1454, a host microcontroller 1210 may enable more or all of the parts of the system, as needed. So in essence, the wakeup signal 1454 performs crude first level motion or orientation change detection. In order to get this crude first-level detection, the raw data from the MEMS device is passed through the Filter and Measurement Unit (FMU) 1470, where the data may be filtered for removing noise and any static aspects of the signal. Optionally some metric of the signal may also be calculated. The signal or metric would then be compared in a comparator 1460 against a threshold 1462, thus producing the Wakeup signal 1454. The threshold 1462 may be a derived value based on configured Motion-Types 1422 or directly configured by the user. It may be noted that a basic, but limited, wake-up interrupt functionality may also be provided in existing art and some off-the-shelf MEMS devices. In case this off-the-shelf functionality is good enough for the application the FMU 1470 and Comparator 1460 software or hardware logic may be bypassed via a multiplexer 1480 based on configuration 1424 information from the user.

The MEMS device 1410 data is also fed into a Pattern Selection Unit (PSU) 1430 which uses the instantaneous MEMS data along with Motion-Types 1422 to determine pattern profiles that the system will use to produce Decisions 1452. These Patterns are mathematical, statistical, signal processing metrics or characterized signals obtained by capturing MEMS device data 1410 while enacting Motion-Type scenarios 1422. The Patterns thus selected are then fed into a Pattern Processing Unit (PPU) 1440, along with the instantaneous MEMS device data. The PPU 1440 in one embodiment may have a memory unit to buffer a set of the MEMS device data. In summary, collectively the PSU 1430 and PPU 1440 form a Pattern Recognition system 1435 of the ISPU 1400 where the PSU 1430, through its operation, understands the environment and produces reference metrics and PPU 1440 performs the algorithmic operations on instantaneous or buffered data and correlates with the reference metrics to produce a Decision 1452. There is also a path from the FMU 1470 to the PPU 1440 to reuse any pattern agnostic calculations previously performed by the FMU 1470.

Continuing with the example of a door and window sensor 222 in a non-limiting way as above, in one embodiment of a security and automation Module, two MEMS devices may be used in its ISPU 1400 viz. an accelerometer and a gyroscope. A three-axis accelerometer produces acceleration tuples (Ax, Ay, Az) quantifying the acceleration components along the three axis X, Y, Z of 3D space. In a static setting, due to an ever present gravitational pull the acceleration tuples can give an idea of the device's orientation. A three-axis gyroscope on the other hand produces angular velocity tuples ($\Omega x$, $\Omega y$, $\Omega z$) which when integrated over time, in a dynamic environment, would produce change in orientation information in terms of angles ($\theta x$, $\theta y$, $\theta z$). In its normal state, the system in this embodiment would be put to sleep with only the accelerometer awake. This configuration is chosen for this embodiment on account of very low operating current characteristics of typical accelerometers. Once a motion is detected by the system on account of the opening of the door and a wakeup event occurs, the microcontroller turns on all components of the system (as described in FIG. 12), including the other MEMS device viz. the gyroscope.

Figure 15:
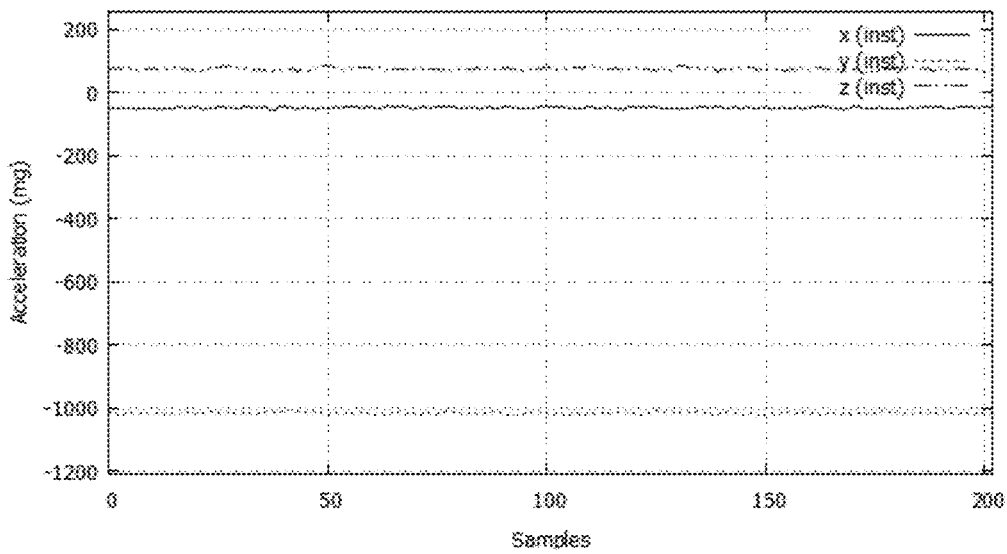
FIG. 15 shows the acceleration measurements from a three-axis accelerometer along the X, Y and Z axes of 3D space.
Figure 16:
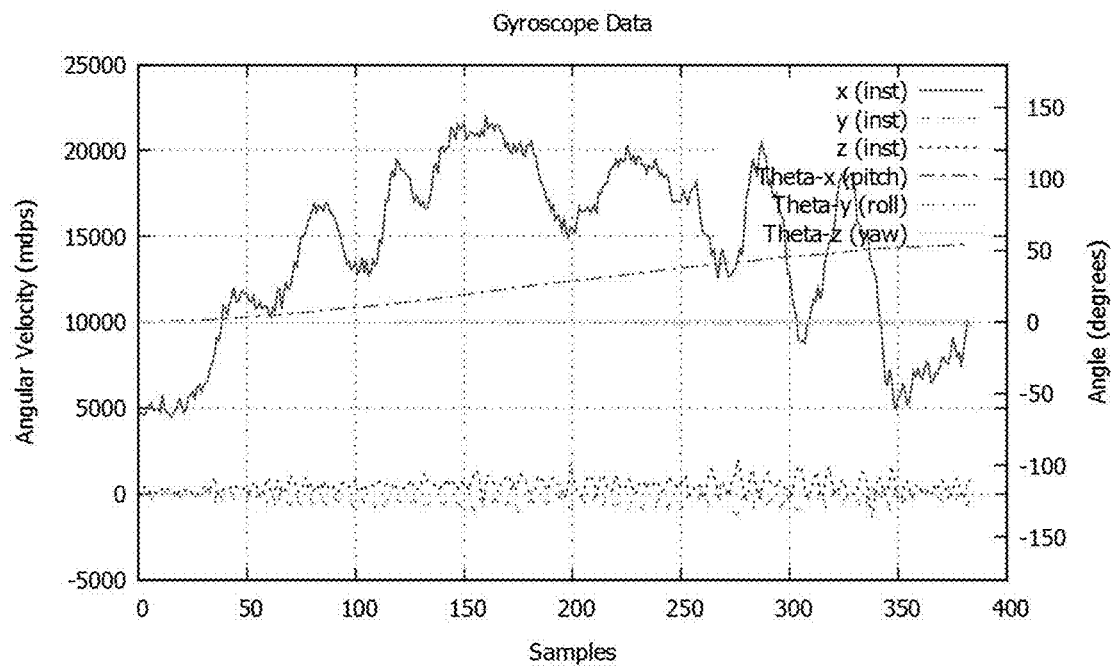
FIG. 16 shows the angular velocity measurements and calculated angular orientation change along the X, Y and Z axes when a door is swung open by 50 degrees around the X-axis of the device.
Figure 17:
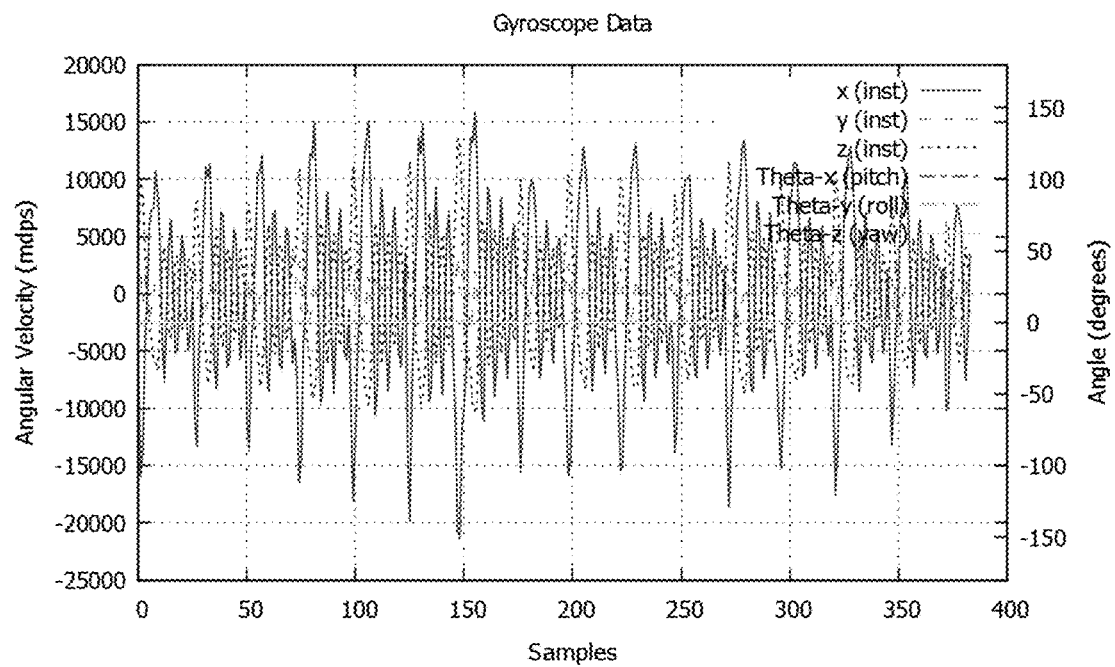

In the above scenario of the embodiment, once the system is awake, all the MEMS data is then processed. The accelerometer, even with the lack of any movement shows instantaneous readings of (Ax, Ay, Az) giving an indication of the installation orientation of the device. In case of the accelerometer, when the device is laid vertical in a way that the Y-Axis of the device is opposite the g-force of the earth the accelerometer should measure a magnitude of 1 g across the Y axis and 0 g across the X and Z axes. FIG. 15 shows practical results with an accelerometer laid vertical like when mounted on a door or window, just prior to the wakeup event happening. FIG. 16 shows practical results simulating a door swing around the X-axis of the MEMS device in 3D space. The capture indicates a change of Ox (Theta-x) by about 50 degrees, which is calculated by integrating the angular velocity samples over time, as shown before. This type of signal can be easily distinguished from other signals that can be produced by say heavy knocking as in FIG. 17 or other nuisance vibrations where there might be no significant change in (θx, θy, θz) and the Theta-x, Theta-y, Theta-z curves are flat.

The PSU 1430 uses the above information to first learn the orientation of the device. After learning about the orientation, it may look for characterized signal of swinging motion in the aforementioned orientation or the next nearest orientation. Although, in this case a straight forward comparison of the angles itself will lead to the correct results, in a more complicated case, say the sliding motion of the door, the PPU 1440 would then capture a set of (Ax, Ay, Az) and (θx, θy, θz) tuples and correlate with the characterized data after an optional adjustment for angular error. The correlation score would then influence the Decision 1452.

As mentioned in the Summary, one innovative embodiment of the present invention can be the aggregate of selected features from systems, methods and devices described in this Detailed Section of this specification. Other embodiments may comprise of, but not limited to, one or more of the features alone or in combination.

Figure 18:
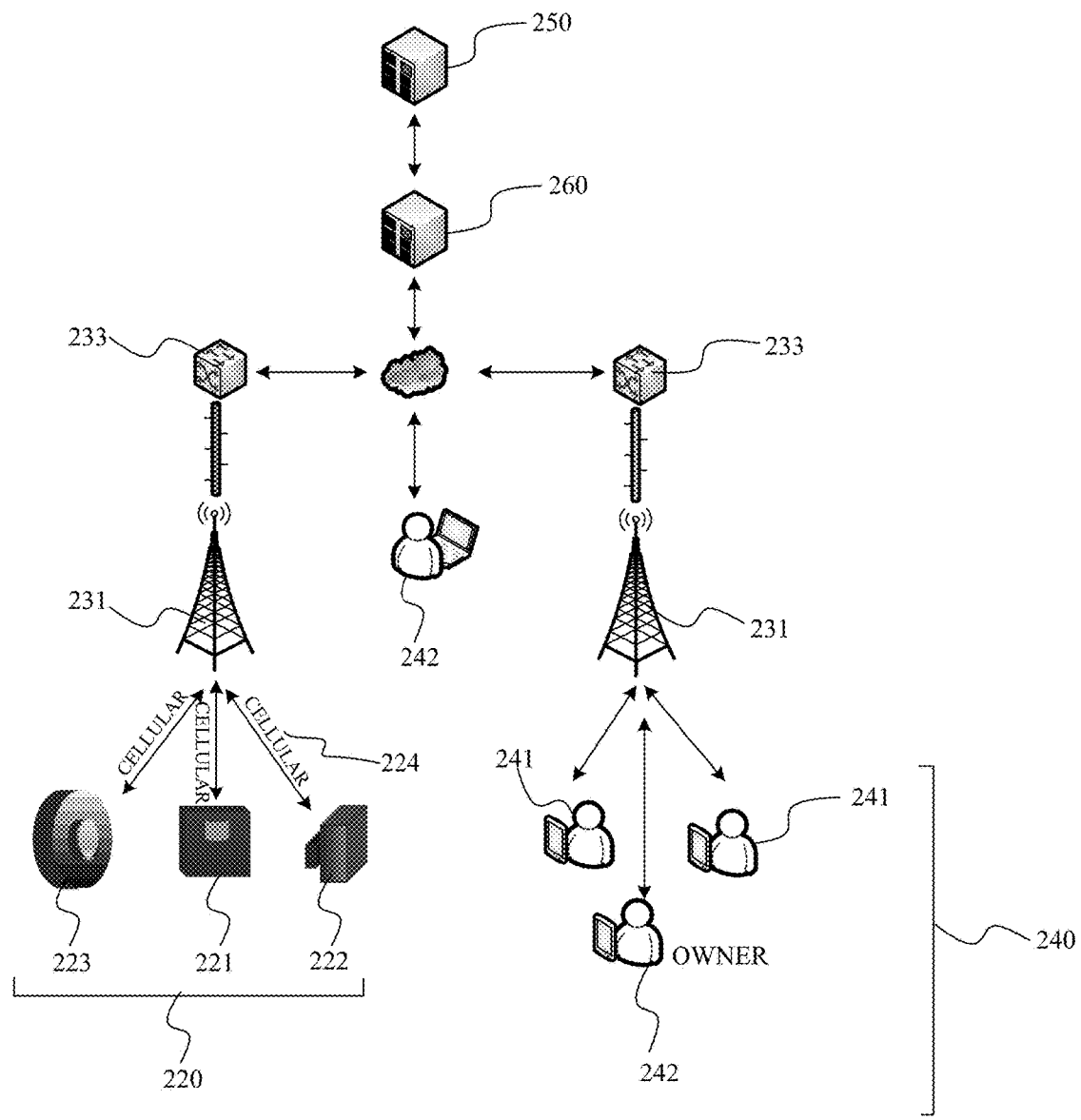
FIG. 18 shows an embodiment of the system architecture where the modules use cellular RF technologies and the Controller is implemented as a web service in the cloud.

To exemplify the above statement, in a different embodiment, completely novel system architecture may be combined with the methods and devices of this specification. An example of one such embodiment can be shown by the system architecture in FIG. 18, where the Modules 220 may be able to use cellular technologies 224 like 2G/3G/4G to directly communicate with a web service 260 in the cloud, which would serve the functions of a Controller 210. The owner 242 would then be able to configure and access the state of the Modules via the web service 260. The web service would in turn also allow a monitoring service 250 to access and backup data and be served with security related events. Note that this embodiment of the system architecture will be combined with other embodiments of the methods and devices discussed earlier to provide a holistic, simple, portable and easy to assemble security and automation system.

In another embodiment, a mobile device (like cellular phone or tablet) may serve as both the Controller and Module to become a very compact and portable solution. In such an embodiment, both the Controller and Module methods can be implemented on the mobile device's software infrastructure.

Figure 19:
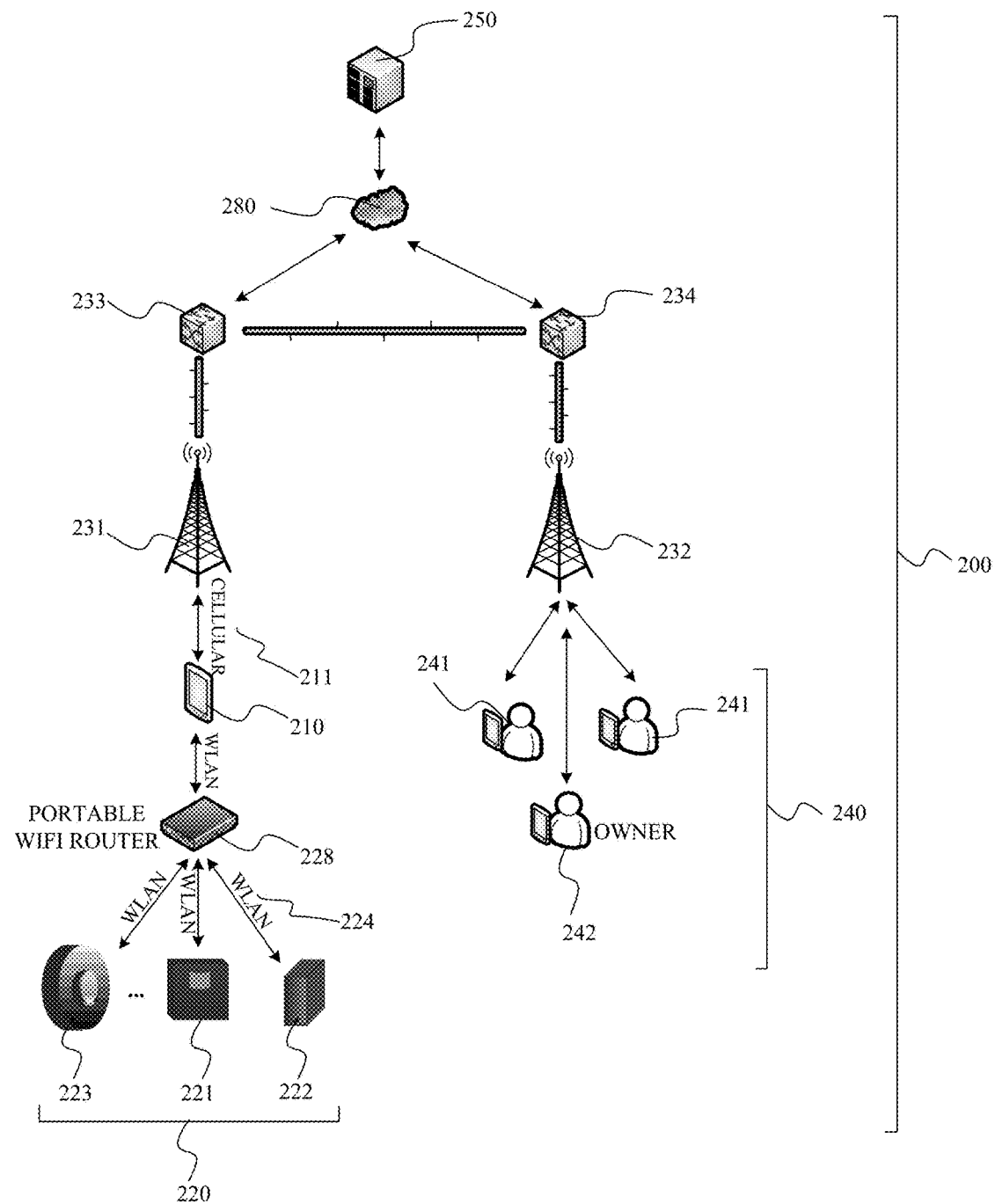
FIG. 19 shows an embodiment of the system architecture where the mobile device that hosts the Controller does not support the soft AP WLAN feature. In this embodiment of the system architecture, a portable router is used to route the data traffic from the Modules to the Controller.
Figure 20:
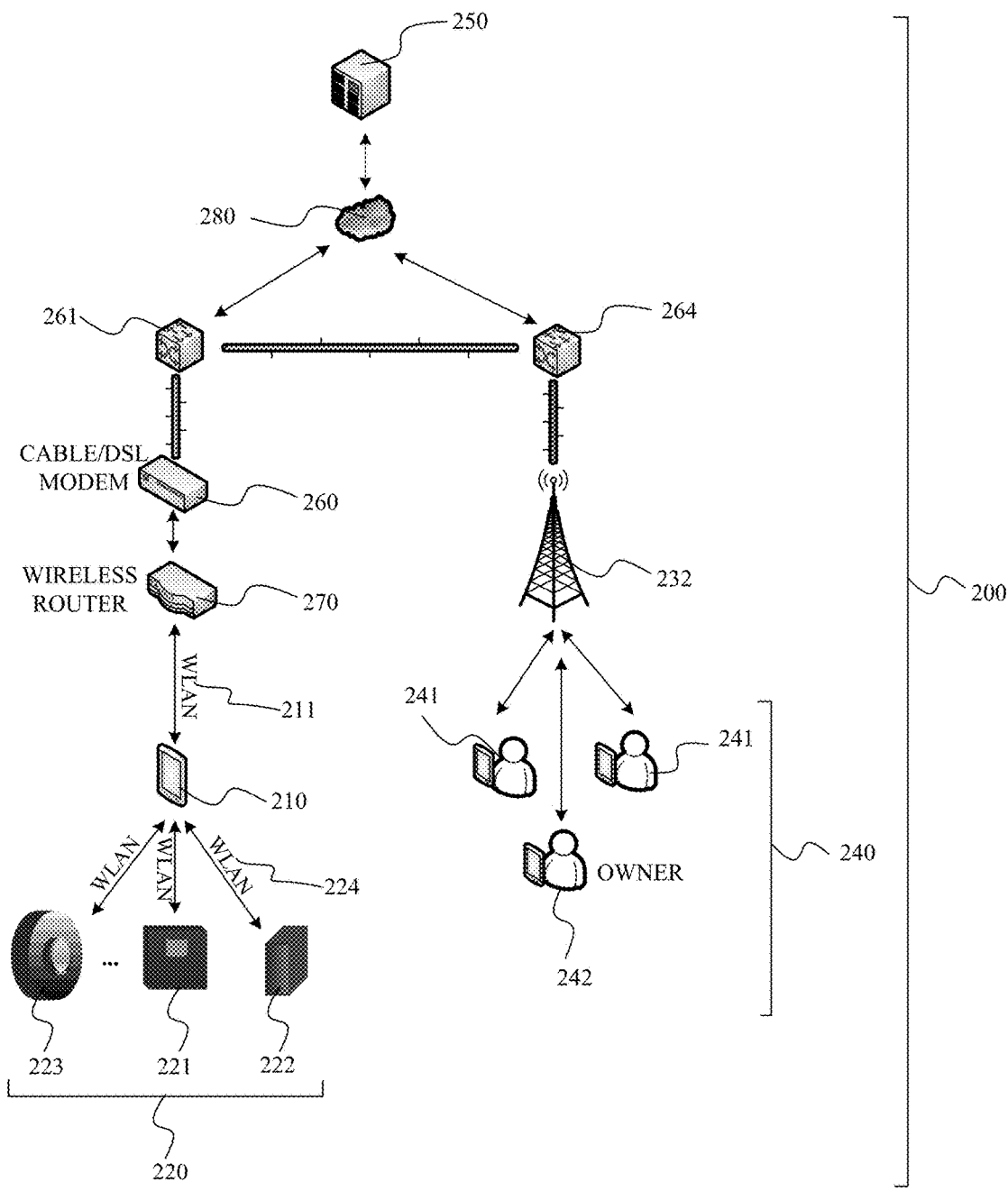
FIG. 20 shows an embodiment of the system architecture where the mobile device that hosts the Controller concurrently supports the soft AP and STA WLAN features.

In yet another embodiment due to limitation of the mobile device's (cellular phone, tablet etc.) hardware or software, it may not be possible to make the phone operate in a Soft AP mode. In such a case the communication between Controller and Modules could use WLANs Peer-to-Peer connectivity called WiFi-Direct. In yet another different embodiment of the system architecture a portable WLAN router 228 will be introduced between the Modules and the Controllers, as shown in FIG. 19. A battery backed portable router would give similar advantages of portability, security and ease as the other previous embodiments. FIG. 20 shows yet another embodiment of the system architecture where the mobile device that hosts the Controller concurrently supports the soft AP and STA WLAN features. In this embodiment of the system architecture, the modules use the WLAN intranet made by the Controller and only the controller uses a pre-existing general WLAN infrastructure.

Based on the discussions so far, following is a list of some of the obvious advantages of the embodiments of the invention described so far.

Figure 3:
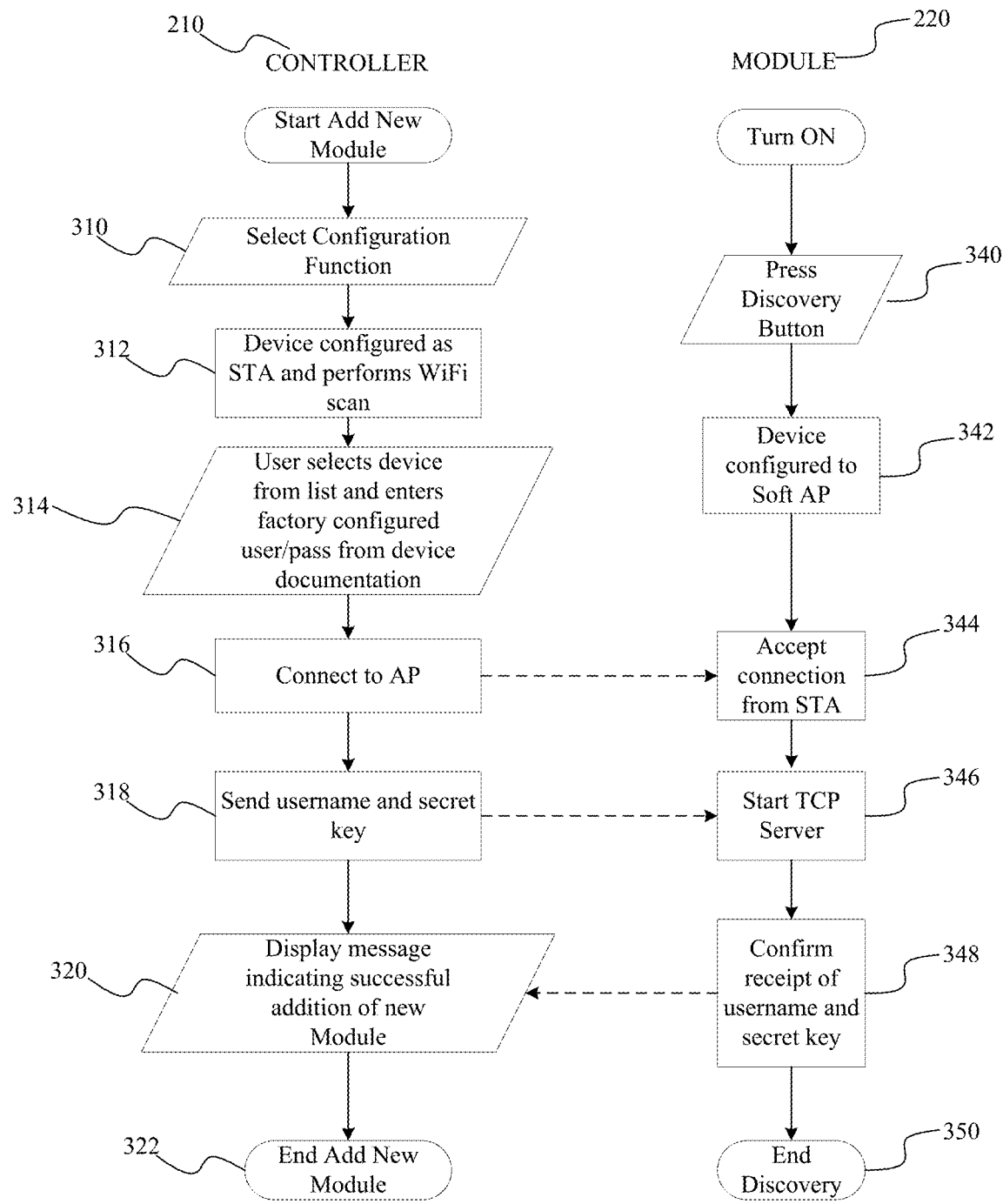
FIG. 3 shows the discovery, configuration and enrollment of a new Module to the security and automation network as per one embodiment.

Portability, Simplicity and Installation Ease—A comparison of FIG. 1 and embodiment in FIG. 2 can easily show the simplification of the overall architecture that lends itself very well to portability and simplicity of the system as a whole. Simplified discovery and enrollment methods, as shown in the embodiment of FIG. 3, reduce the number of devices needed to configure and operate Modules in this system. The reason is that in this embodiment of enrollment and discovery the Module is temporarily configured as Soft AP while the Controller serves as an STA. In this case the owner can use the Input/Output (IO) interfaces of the Controller that is a mobile device in STA mode and can thus enter authentication and other configuration information.

In normal mode, configuring the Controller to operate in Soft AP mode as shown by the embodiments in FIG. 2 and FIG. 4 again reduce the need for WLAN routers and further add to the portability, simplicity and installation ease of the system.

Battery backed Modules with a flexible and configurable sleep strategy, as shown in the embodiments of FIGS. 5, 6 and 7 enhance the portability and installation ease of the Modules. This also reduces the need for regular maintenance in the form of battery replacement.

Configurability and Scalability—The above embodiments allow usage of RF technologies, like WLAN and cellular, that don't have a throughput limitation like Z-Wave and Zigbee. On account of this the Controller in the above embodiments can serve the communication needs of Module types like door and window sensors that don't need a large amount of throughput but can also scale to serve the communication needs of devices like a camera module that may need to transmit a live stream of video.

Also it is quite easy to scale the system by discovering and enrolling new Modules as described in FIG. 3. Since in that embodiment a WLAN based intranet is created, adding new STAs does not pose any stringent limits.

It is to be noted, as before, that while the above described embodiments allow usage of WLAN or cellular RF technology for its System, Methods and Devices, some of the novel aspects of this specification can also be realized using Z-Wave, Zigbee or other communication protocols which have shown to be limited in terms of throughput. As an example a Module with a Hardware architecture like that shown in FIG. 12 can be implemented so that the WLAN RF chipset can be replaced with say a Z-Wave RF chipset. This new embodiment of a Module can still have the ISPU 1400 system as described in FIG. 14 to produce an embodiment of a simple and easy to install door and window Z-Wave sensor that can communicate with a prior art Z-Wave based system.

On account of a Rules engine as exemplified in the embodiment of Controller's GUI shown in FIG. 11, the Security and Automation System becomes very configurable.

It should also be noted that the Security and Automation system can be configured to operate with or without a monitoring service, by adjusting the Notification List as shown in FIG. 10. This can be a money saving feature for users that don't need a monitoring service but instead want to rely on their personal network to confirm their safety.

Learning Curve—The Controller does not need to implement a new GUI framework and can be implemented using the native GUI framework available on mobile device platforms as shown in FIGS. 8, 9, 10 and 11. This will reduce the need for the user to learn interactions of a new custom GUI or some other unseen user interface elements.

Security—Since the system in its embodiments shown in FIGS. 2, 18, 19 and 20 use the inherent security of WLAN and cellular RF technologies, the system is as secure as other commercial secure networks. Due to the fact that the system uses common standards that are widely used, any new exposed hack would get quick fixes by a large development community and a body of commercial stakeholders. The embodiments also suggest usage of additional application layer encryption using TLS or similar protocols.

Reliability—Due to fact that both Modules and the Controller in above embodiments operate on battery, a power outage will not disrupt the system. In addition being a wireless system the various embodiments are not susceptible to malicious wire tampering related disruptions. The system can also detect RF jamming attempts using techniques similar to described earlier in this section.

Range—The above embodiments can be implemented with RF technologies like WLAN and cellular with a long range, thus allowing a large property or vessel to be serviced by them. In an event where the RF technology used to service a property or vessel cannot service it's full expanse, off-the-shelf packet relay devices can be used to extend the range of there widely deployed RF technologies. As an example in case of WLAN, packet relay devices (WiFi range extenders) are commonly available in stores.

Although the descriptions of the embodiments of the Systems, Methods and Devices articulated above contain specifics, these should not be construed as limiting in scope—rather they should be considered to be facilitating visualization of the currently preferred embodiments.

Flowcharts are used to describe the steps of the present invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowcharts may be included in performing this method. Accordingly, the specific arrangement of steps shown in FIG. 3, FIG. 4, FIG. 5, FIG. 6 and FIG. 7 should not be construed as limiting the scope of the invention.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a", "an", "said" and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a method" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

The invention claimed is:

1. A security and automation system comprising:
    a controller, said controller comprising a device memory, a processor, a display and one or more communication interfaces;
    a module comprising a processing unit, a microcontroller, a WLAN chipset, a power unit and one or more peripherals, said module being configurable as an access point or as a station as per requirement to remain in a wireless intranet network of said controller; and
    a controller application installed in said device memory of said controller, said controller application comprising instructions that, when executed by said processor, configure said controller to:
    act as a station and perform a scan to discover said module when said module is configured as an access point;
    enable a user to enter a password corresponding to said discovered module through a user interface provided by said controller;
    transmit said password to said discovered module;
    transmit a user name and a secret key corresponding to said controller to said discovered module;
    act as an access point after said discovered module becomes an enrolled module of said wireless intranet network of said controller by confirming receipt of said user name and said secret key;
    listen to one or more events coming from said enrolled module acting as a station on account of a security event or a monitoring event; and
    process said one or more events through a rules engine set in said controller application to take one or more actions.

2. The security and automation system as in claim 1, wherein said controller configured as an access point is an IEEE 802.11 x software-based access point.

3. The security and automation system as in claim 1, wherein said module configured as access points is an IEEE 802.11 x software-based access point.

4. The security and automation system as in claim 1, wherein said one or more communication interfaces of said controller are used to establish a communication outside said wireless intranet network with one or more mobile devices or with a cloud service or with a monitoring system of said security and automation system for sending of one or more alerts or messages as a part of said one or more actions and for enabling said configuration of said controller.

5. The security and automation system as in claim 4, wherein a cellular technology available from said one or more communication interfaces is used to establish said communication with said one or more mobile devices or with said cloud service or with said monitoring system over internet.

6. The security and automation system as in claim 4, wherein one of said one or more communication interfaces used to establish said communication uses an IEEE 802.11x standard wireless technology to access internet using said controller's existing internet service.

7. The security and automation system as in claim 1, wherein said one or more actions include sending of an indication corresponding to said security event or said monitoring event as per a specific notification list when said controller is maintained in an armed state or generation of an audio notification or a silent notification when said controller is maintained in a disarmed state.

8. The security and automation system as in claim 1, wherein said security and automation system is maintained at a specific state as per said rules engine and one or more operations are actuated based on one or more directives given by said rules engine.

9. The security and automation system as in claim 1, wherein any attempt made to jam signal between said controller and said module is detected by said controller by comparing a change in a Receiver Signal Strength Indicator (RSSI) versus a Signal to Noise (SNR) change.

10. A method in a security and automation system, said system comprising one or more modules configured as stations and communicatively enrolled to a wireless network of a controller, said one or more modules comprising a processing unit, a wireless chipset and one or more peripherals, and said controller comprising a device memory, a controller application installed in said device memory, a processor, a display and a transceiver, said transceiver including a WLAN stack; said method comprising the steps of:
  determining feasibility of employing a first sleep policy in said one or more modules;
  turning off said wireless chipset and a part of said processing unit, for an indefinite period, if said first sleep policy is employed;
  employing a second sleep policy in said one or more modules if said first sleep policy is not employed, said second sleep policy being a timed sleep policy;
  waking up of said one or more modules maintained under said first sleep policy or under said second sleep policy at an occurrence of an event detected by said one or more peripherals;
  determining qualification of said event by said one or more modules by performing one or more motion pattern recognition operations on a data acquired against said event;
  communicating to said controller said event through a message on ascertaining qualification of said event by said one or more modules;
  acknowledging receipt of said message by said controller by communicating an acknowledgement with a piggyback parameter off; and
  returning to said first sleep policy or to said second sleep policy by said one or more modules on receiving said acknowledgement with said piggyback parameter off;
  wherein said controller processes said message about said event to take one or more actions in accordance with a state information as per a rules engine set in said controller application.

11. The method as in claim 10, wherein said step of employing said second sleep policy comprises the steps of:
  indicating said controller to buffer any request frame meant for said one or more modules;
  setting a timer interrupt by said one or more modules before going to sleep;
  waking up of said one or more modules on triggering of said timer interrupt;
  checking of beacons from said controller by said one or more modules to see if there is any said frame to consume on said waking up;
  going back to sleep by said one or more modules on not finding said frame to consume; and
  entering Power Save-Poll procedure by said one or more modules on finding said frame to consume.

12. The method as in claim 10, further comprising:
  waking up of said one or more modules maintained under said first sleep policy by a forced wake up event initiated by a user for an update;
  buffering of information related to said update in said device memory;
  communicating said forced wake up event to said controller through a wake up message by said one or more modules;
  acknowledging receipt of said wake up message by said controller by communicating an acknowledgement with a piggyback parameter on;
  sending of a query command by said one or more modules to said controller on receiving said piggyback parameter;
  communicating said buffered information related to said update to said one or more modules; and
  going back to said first sleep policy by said one or more modules after receiving and acknowledging said information related to said update.

13. The method as in claim 10, wherein said one or more actions include sending of an indication corresponding to said event as per a specific notification list when said controller is maintained in an armed state or generation of an audio notification or a silent notification when said controller is maintained in a disarmed state.

14. The method as in claim 10, wherein said one or more actions include switching on and switching off lights, opening and closing of curtains, capturing camera feeds and capturing GPS coordinates.

15. The method as in claim 10, wherein said one or more modules are configurable to establish a direct communication between said one or more modules and a cloud service.

16. An inertial sensor module comprising a plurality of components in a security and automation system, said plurality of components comprising: one or more peripherals capable of detecting one or more motion types; one or more wireless circuitries comprising a wireless chipset and one or more antennas; and a processing circuitry communicatively connected to said one or more peripherals, said processing circuitry comprising an inertial signal processing unit (ISPU), said processing circuitry is configured to: produce, a wakeup output, by a first level processing of a Micro Electro Mechanical Systems (MEMS) device data by a filter and measurement unit and then comparing a data output from said first level processing against a threshold value by a comparator, wherein said MEMS device data is generated by one or more MEMS devices included in said ISPU; wakeup, one or more components of said plurality of components, by said wakeup output as per requirement; receive one or more user inputs in the form of a configuration data to configure said one or more MEMS devices or in the form of said one or more motion types that said ISPU needs to track; produce, by a pattern selection unit included in said ISPU, a plurality of reference metrics based on said one or more motion types and a said MEMS device data; and perform, by a pattern processing unit included in said ISPU, one or more algorithmic operations on said MEMS device data received instantaneously from said one or more MEMS devices or already buffered in said pattern processing unit and correlate said MEMS device data with said plurality of reference metrics to produce a decision output based on which said module decides on sending or not sending a signal to a controller of said security and automation system with which said module is communicatively connected through a wireless intranet.

\* \* \* \* \*